US008630177B2

(12) United States Patent
Vasseur et al.

(10) Patent No.: US 8,630,177 B2
(45) Date of Patent: Jan. 14, 2014

(54) DYNAMIC DIRECTED ACYCLIC GRAPH (DAG) ROOT BYPASS FOR COMPUTER NETWORKS

(75) Inventors: Jean-Philippe Vasseur, Saint Martin d'Uriage (FR); Jonathan W. Hui, Foster City, CA (US); Atul B. Mahamuni, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 13/405,828

(22) Filed: Feb. 27, 2012

(65) Prior Publication Data

US 2013/0223218 A1 Aug. 29, 2013

(51) Int. Cl.
*G01R 31/08* (2006.01)

(52) U.S. Cl.
USPC ........... 370/232; 370/229; 370/230; 370/231; 370/254; 370/255; 370/256

(58) Field of Classification Search
USPC .......... 370/232, 229, 230, 231, 254, 255, 256
See application file for complete search history.

(56) References Cited

U.S. PATENT DOCUMENTS

| 6,976,088 | B1 | 12/2005 | Gai et al. | |
|---|---|---|---|---|
| 7,693,064 | B2 | 4/2010 | Thubert et al. | |
| 7,835,378 | B2 * | 11/2010 | Wijnands et al. | ............. 370/408 |
| 7,924,722 | B2 | 4/2011 | Thubert et al. | |
| 8,009,591 | B2 | 8/2011 | Retana et al. | |
| 1,023,157 | A1 | 9/2011 | Vasseur et al. | |
| 8,363,662 | B2 | 1/2013 | Thubert et al. | |
| 2007/0177525 | A1 | 8/2007 | Wijnands et al. | |
| 2009/0040945 | A1 * | 2/2009 | Xhafa et al. | ................... 370/254 |
| 2011/0228696 | A1 | 9/2011 | Agarwal et al. | |
| 2012/0155260 | A1 * | 6/2012 | Vasseur et al. | ............. 370/230.1 |

FOREIGN PATENT DOCUMENTS

WO WO-2011115679 A1 9/2011

OTHER PUBLICATIONS

Gnawali, et al., "The Minimum Rank Objective Function with Hysteresis", draft-ieft-roll-minrank-hysteresis-of-04, IETF Internet-Draft, May 2011, 11 pages.

(Continued)

*Primary Examiner* — Huy D Vu
*Assistant Examiner* — Kuo T Chiang
(74) *Attorney, Agent, or Firm* — Edwards Wildman Palmer LLP; James M. Behmke; Stephen D. LeBarron

(57) ABSTRACT

In one embodiment, traffic flows through a root node of a primary directed acyclic graph (DAG) in a computer network are monitored to detect whether a particular traffic flow is above a path cost threshold. If so, then a corresponding source device may be instructed to cease using the primary DAG for the particular traffic flow, and specific action may be taken based on whether the particular traffic flow is point-to-point (P2P) or point-to-multipoint (P2MP). In particular, in response to the particular traffic flow being P2P, a source route may be computed and sent to the source device to cause the source device to use the source route for the particular traffic flow, while in response to the particular traffic flow being P2MP, the source device may be instructed to create a secondary DAG for the particular traffic flow with the source device as the secondary DAG root.

25 Claims, 24 Drawing Sheets

(56) References Cited

OTHER PUBLICATIONS

Thubert, et al., "RPL Objective Function Zero", draft-ietf-roll-of0-15, IETF Internet-Draft, Jul. 2011, 14 pages.

Vasseur, et al., "Routing Metrics Used for Path Calculation in Low Power and Lossy Networks", draft-ietf-roll-routing-metrics-19, IETF Internet-Draft, Mar. 2011, 31 pages.

Winter, et al., "RPL: IPv6 Routing Protocol for Low Power and Lossy Networks", draft-ietf-roll-rpl-19, IETF Internet-Draft; Mar. 2011, 164 pages.

Goyal, et al., "Reactive Discovery of Point-to-Point Routes in Low Power and Lossy Networks", draft-ietf-roll-p2p-rpt-07, IETF Internet-Draft; Jan. 2012, 27 pages.

Lampreia, et al., "Notification of Transmittal of the International Search Report and the Written Opinion of the International Searching Authority, or the Declaration", Patent Cooperation Treaty, May 8, 2013, 10 pages, PCT/US2013/027887, European Patent Office, Rijswijk, Netherlands.

Winter, et al., "RPL: IPv6 Routing Protocol for Low Power and Lossy Networks", draft-ietf-roll-rpl-02, IETF Internet-Draft; Sep. 2009, 97 pages.

\* cited by examiner

DYNAMIC DIRECTED ACYCLIC GRAPH (DAG) ROOT BYPASS FOR COMPUTER NETWORKS

TECHNICAL FIELD

The present disclosure relates generally to computer networks, and, more particularly, to routing traffic on directed acyclic graphs (DAGs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Notably, RPL (and other distance vector protocols) supports two modes of operation: storing and non-storing. When the traffic is mostly point-to-multipoint (P2MP) or multipoint-to-multipoint (MP2MP), non-storing mode, which relies on hop-by-hop routing in the UPSTREAM direction of the DAG and source routing in the DOWNSTREAM direction (since nodes do not store routing states) is perfectly appropriate. On the other hand, it may be sub-optimal for point-to-point (P2P) traffic between arbitrary nodes in the network. Indeed for each packet between a node "A" and a node "B" in the network domain (e.g., LLN), the traffic flow has to transit through a root node of the DAG (e.g., an LLN border router or "LBR"), thus increasing the path cost, delays, and increasing traffic congestion closer to the root.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
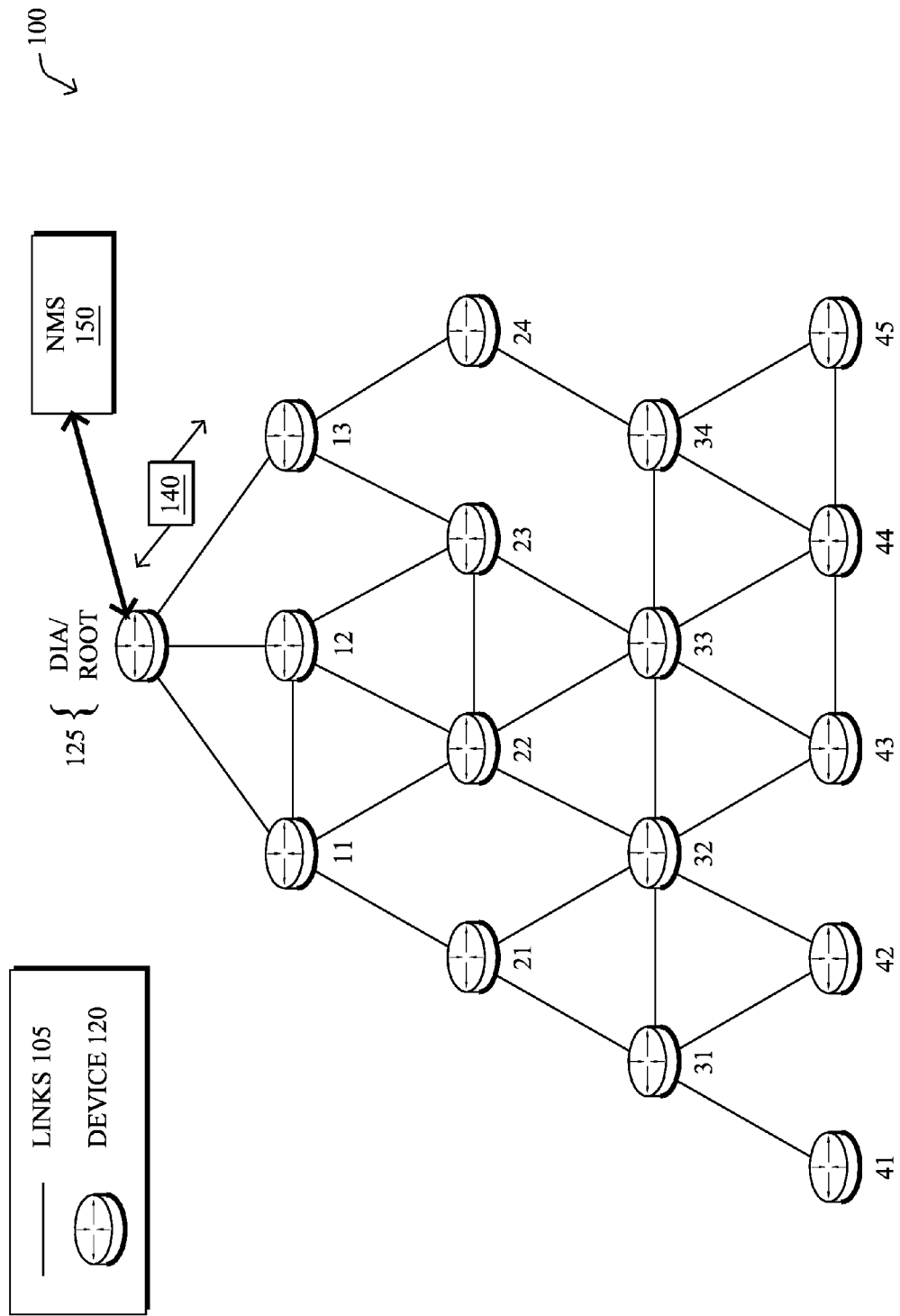
FIG. 1 illustrates an example computer network.

According to one or more embodiments of the disclosure, traffic flows through a root node of a primary directed acyclic graph (DAG) in a computer network are monitored to detect whether a particular traffic flow is above a path cost threshold. If so, then the a corresponding source device may be instructed to cease using the primary DAG for the particular traffic flow, and specific action may be taken based on whether the particular traffic flow is point-to-point (P2P) or point-to-multipoint (P2MP). In particular, in response to the particular traffic flow being P2P, a source route may be computed and sent to the source device to cause the source device to use the source route for the particular traffic flow, while in response to the particular traffic flow being P2MP, the source device may be instructed to create a secondary DAG for the particular traffic flow with the source device as the secondary DAG root.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), personal area networks (PANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 120 (e.g., labeled as shown, "11," "12," . . . "45") interconnected by various methods of communication. For instance, the links 105 may be wired links or shared media (e.g., wireless links, PLC links, etc.) where certain nodes 120, such as, e.g., routers, sensors, computers, etc., may be in communication with other nodes 120, e.g., based on distance, signal strength, current operational status, location, etc. The "root" node 125 (or border router) may provide connectivity to the devices 120 to a global network, as described herein. In addition, a network management server (NMS) 150 may also be present within the network 100, such as part of the global network, connected to nodes 120 via root node (border router) 125. Those skilled in the art will understand that any number of nodes, devices, links, etc. may be used in the computer network, and that the view shown herein is for simplicity. Also, those skilled in the art will further understand that while the network is shown in a certain orientation, particularly with a single root node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
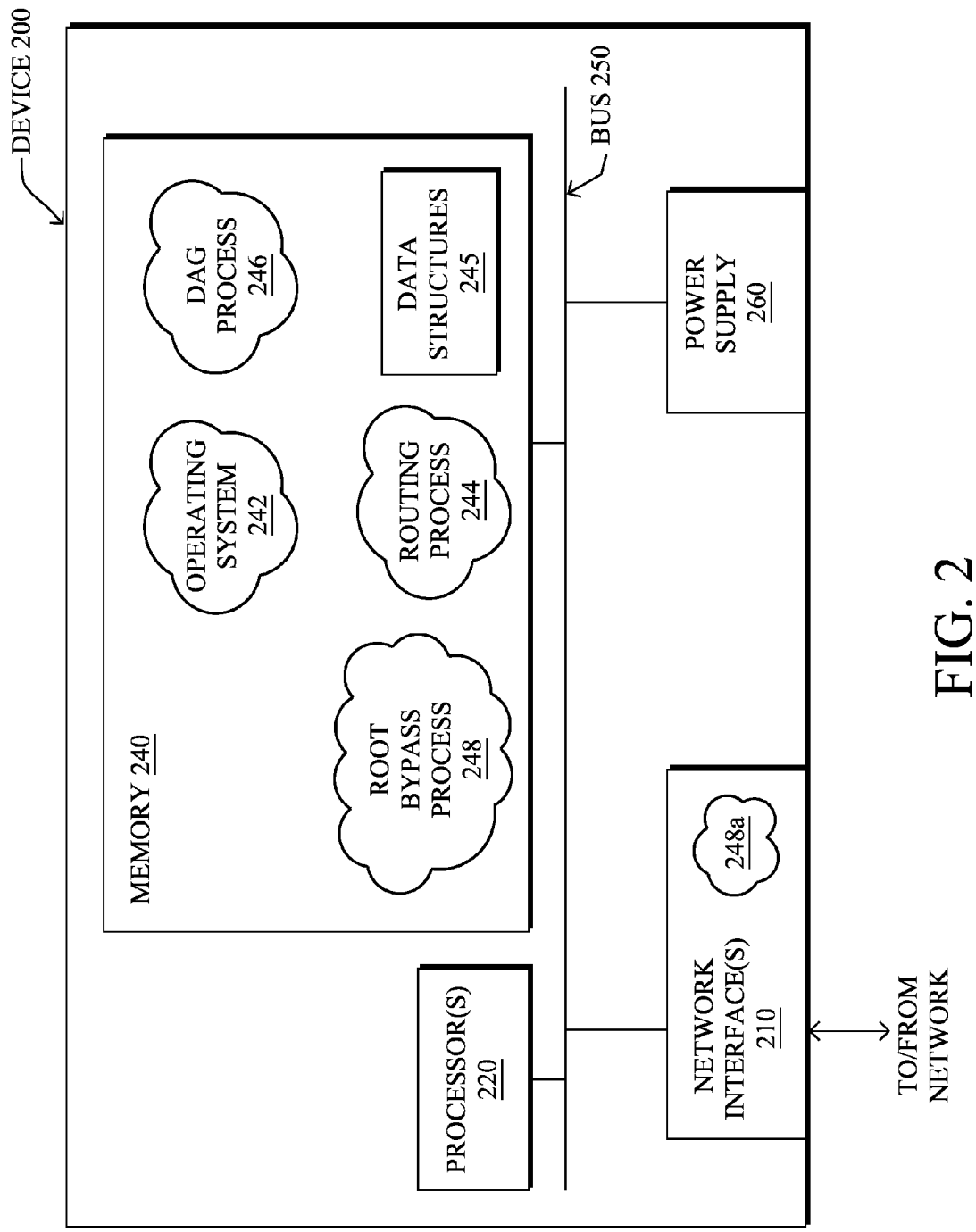
FIG. 2 illustrates an example network device/node.

FIG. 2 is a schematic block diagram of an example node/device 200 that may be used with one or more embodiments described herein, e.g., as any of the nodes/devices shown in FIG. 1 above (nodes 120, 125, and NMS 150). The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246 (on nodes 120 and 125), and an illustrative "root bypass" process 248, as described herein. Note that while root bypass process 248 is shown in centralized memory 240, alternative embodiments provide for the process to be specifically operated within the network interfaces 210 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An illustrative architecture that may be used for the Internet of Things (IoT)/LLNs replaces smart objects with Minimalistic Connected Objects (MCOs) limited to providing basic secure connectivity to an LBR, at the fringe of "classic IP networks" is connecting LLNs. LBRs (e.g., the root nodes) illustratively host Distributed Intelligence Agents (DIAs), which are software/hardware modules fed by a number of inputs such as, e.g., traffic flow observation using deep packet inspection, SLA requirements specified by the user and provided by a Central Intelligence Controller (CIC) (e.g., NMS 150). DIAs may also host a learning machine observing the flows and also the network dynamics and behavior trends, such that the DIA may further perform a number of tasks interacting with MCOs to activate when/where/if the required networking features such as network management, routing, quality of service (QoS), call admission control (CAC), etc. in the network.

An example protocol specified in an Internet Engineering Task Force (IETF) Internet Draft, entitled "RPL: IPv6 Routing Protocol for Low Power and Lossy Networks"<draft-ietf-roll-rpl-19> by Winter, et al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of0-15> by Thubert (Jul. 8, 2011 version) and "The Minimum Rank Objective Function with Hysteresis"<draft-ietf-roll-minrank-hysteresis-of-04> by 0. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
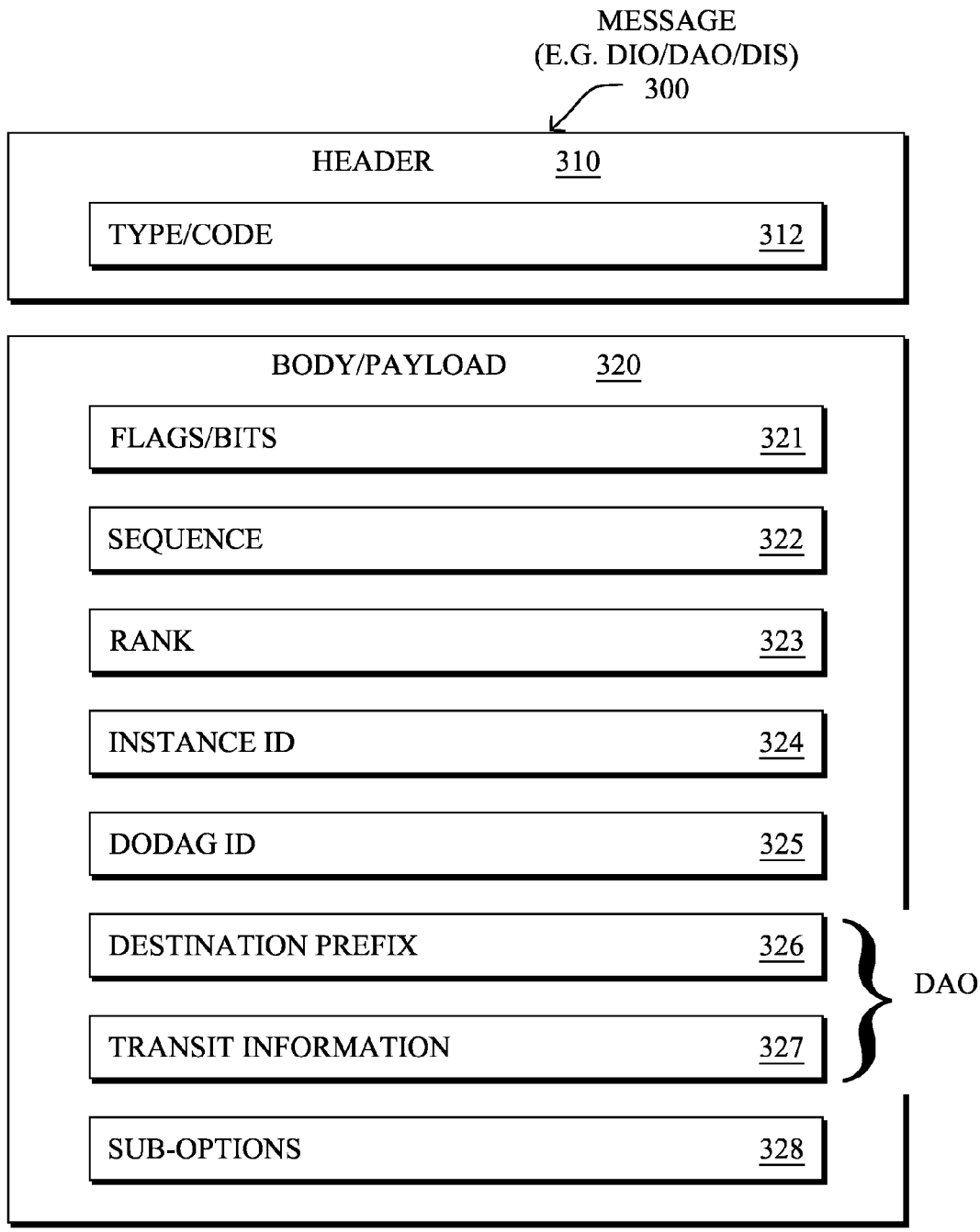
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
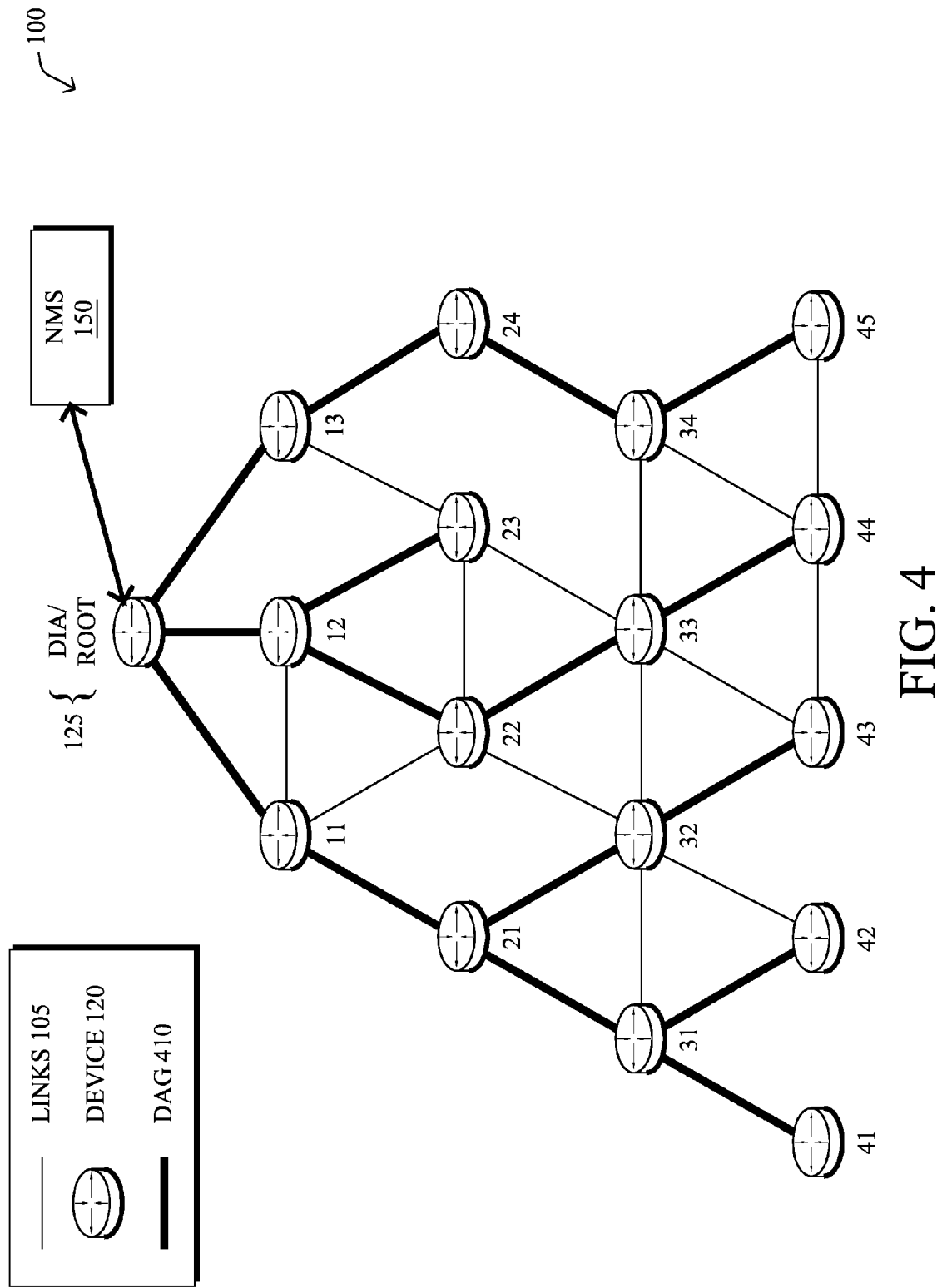
FIG. 4 illustrates an example directed acyclic graph (DAG) in the computer network as in FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Figure 5:
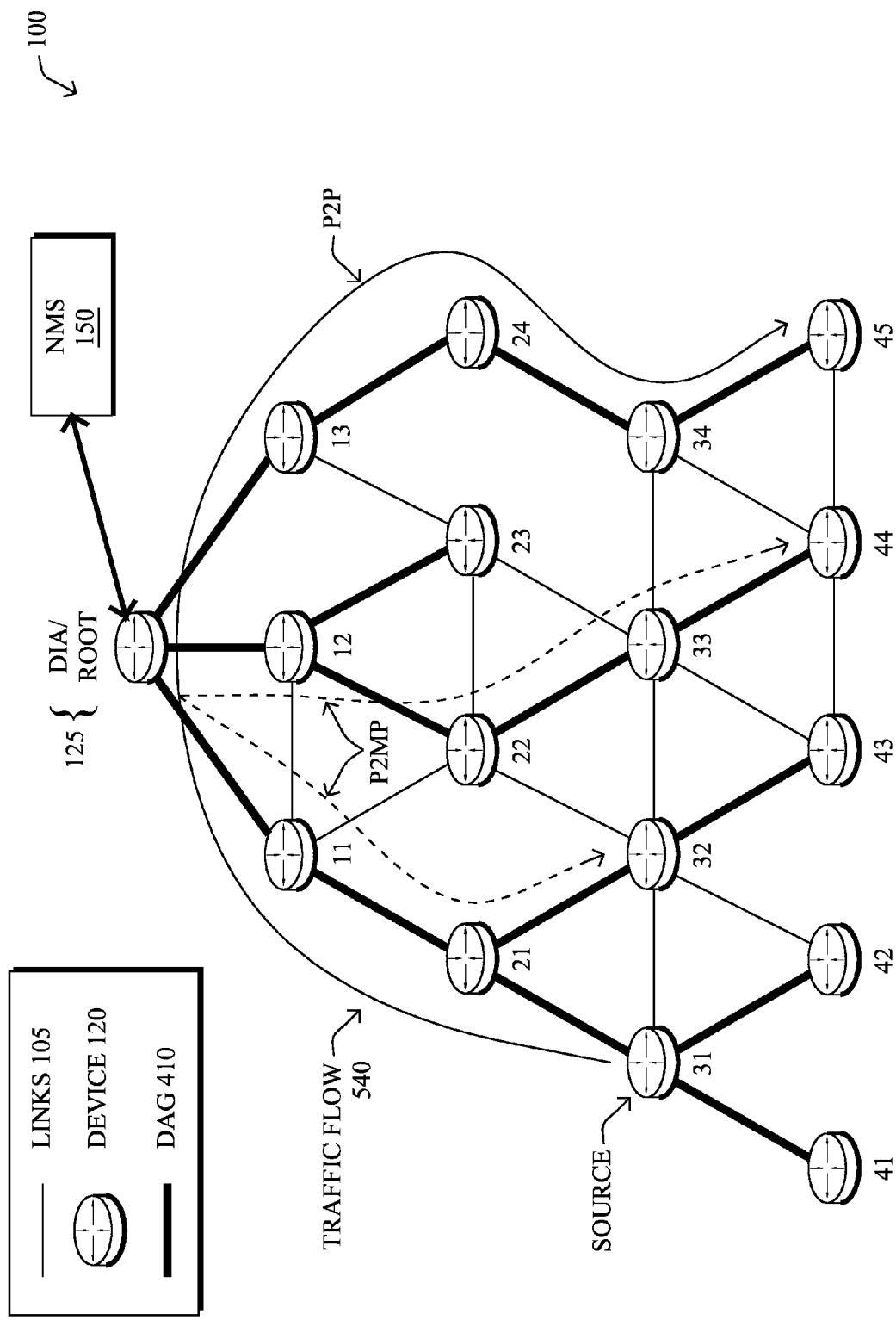
FIG. 5 illustrates example traffic flows.

As noted above, RPL (and other distance vector protocols) supports two modes of operation: storing and non-storing. When the traffic is mostly point-to-multipoint (P2MP) or multipoint-to-multipoint (MP2MP), non-storing mode, which relies on hop-by-hop routing in the UPSTREAM direction of the DAG and source routing in the DOWNSTREAM direction (since nodes do not store routing states) is perfectly appropriate. For example, as shown in FIG. 5, assume that a source node 31 desires to send traffic 540 (e.g., packets 140) to one or more destination nodes, such as a point-to-point flow 540 to node 45 (solid line), or else also to nodes 32 and 44 as a P2MP flow (additional dashed lines). According to the source-routing non-storing mode, node 31 simply sends the traffic flow UPSTREAM (or upward) toward the root node 125, which then supplies a source route to each branch of the flow in the DOWNSTREAM (or downward) direction, e.g., ROOT-13-24-34-45 (based on the DAG 410 of FIG. 4) for the flow directed toward destination node 45, and ROOT-11-21-32 and ROOT-12-22-33-44 for the optional P2MP flows toward nodes 32 and 44, respectively.

As also noted above, however, the source-routing non-storing mode may be sub-optimal for P2P traffic between arbitrary nodes in the network, or even P2MP in certain topologies. Indeed for each packet between node 31 and a node 45 in the network domain (e.g., LLN), the traffic flow has to transit through a root node of the DAG (e.g., an LBR), thus increasing the path cost, delays, and increasing traffic congestion closer to the root. Alternatives such as reactive routing mechanisms, allow for finding "optimal" (or near optimal) paths between arbitrary nodes in the network, but at the cost of network-wide probe flooding, among other concerns generally understood in the art.

Dynamic DAG Root Bypass

The techniques herein propose a dynamic trigger for the formation of a node-to-node source route and/or ad-hoc/on-the-fly DAG from a source node to the destination(s), thus enabling a direct path between the pair of nodes exchanging traffic that bypasses the root node of the original DAG. Though a property of source-routed networks using proactive non-storing routing is that all traffic would transit via the root node, the techniques herein may also be applied to non source-routed networks.

Specifically, according to one or more embodiments of the disclosure as described in detail below, traffic flows through a root node of a primary directed acyclic graph (DAG) in a computer network are monitored to detect whether a particular traffic flow is above a path cost threshold. If so, then a corresponding source device may be instructed to cease using the primary DAG for the particular traffic flow, and specific action may be taken based on whether the particular traffic flow is point-to-point (P2P) or point-to-multipoint (P2MP). In particular, in response to the particular traffic flow being P2P, a source route may be computed and sent to the source device to cause the source device to use the source route for the particular traffic flow, while in response to the particular traffic flow being P2MP, the source device may be instructed to create a secondary DAG for the particular traffic flow with the source device as the secondary DAG root.

Illustratively, the techniques described herein may be performed by hardware, software, and/or firmware, such as in accordance with the "root bypass" process 248/248a, which may contain computer executable instructions executed by the processor 220 (or independent processor of interfaces 210) to perform functions relating to the techniques described herein, e.g., in conjunction with routing process 244 and/or DAG process 246. For example, the techniques herein may be treated as extensions to conventional protocols, such as the illustrative RPL protocol or other distance vector protocols, and as such, may be processed by similar components understood in the art that execute those protocols, accordingly.

Figure 6:
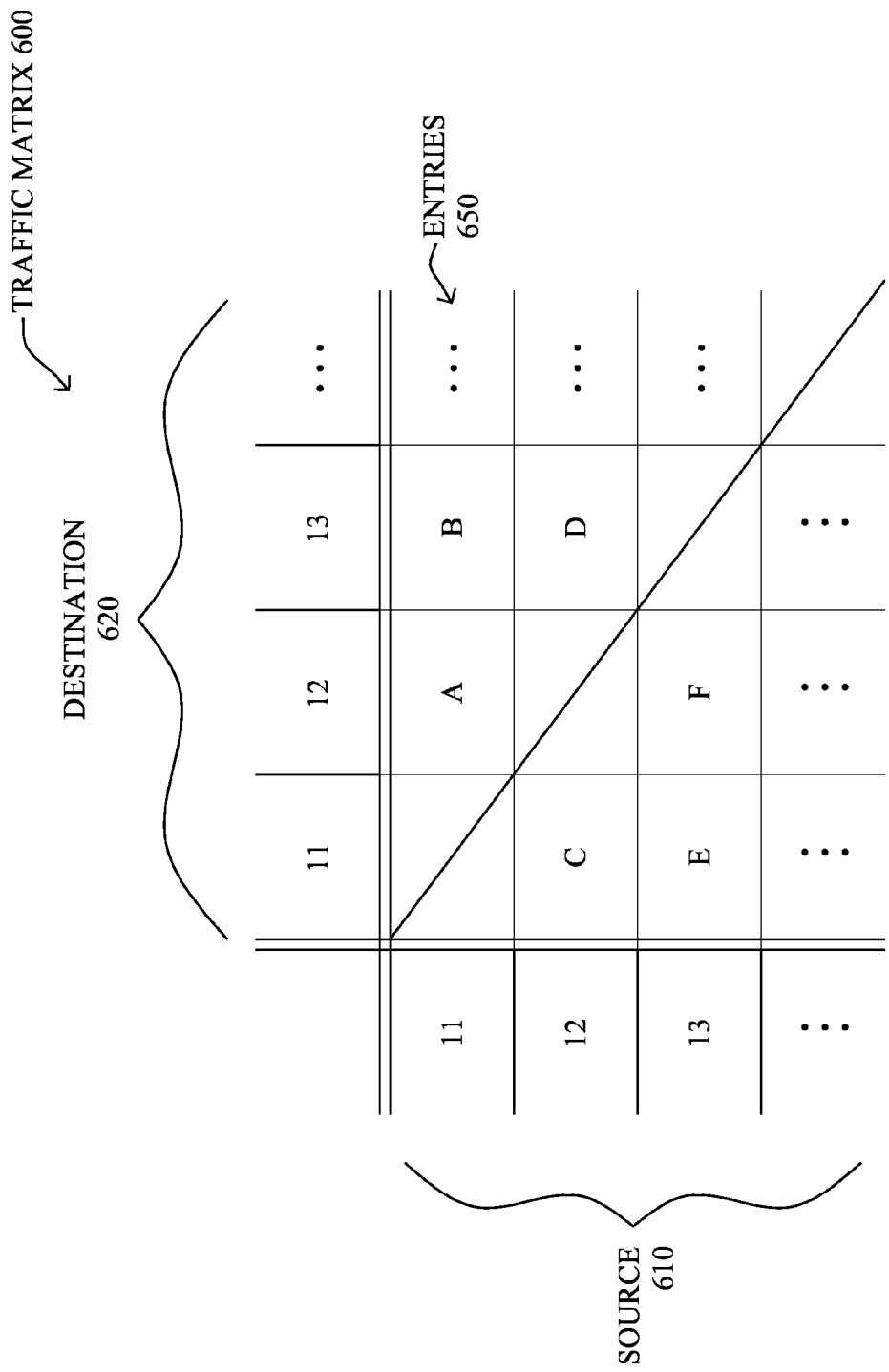
FIG. 6 illustrates an example simplified traffic matrix.

Operationally, a DIA (Distributed Intelligent Agent) may be hosted within the network 100, illustratively on the root node (LBR) with the illustrative "root bypass" process 248 tasked with observing the traffic between any pair of nodes transiting through the root, i.e., monitoring traffic flows 540 through a root node of a primary DAG 410. Illustratively, the DIA may correspondingly build a traffic matrix between each pair of nodes in the network. For instance, as shown in FIG. 6, an example traffic matrix 600 may be created comprising a mapping between source devices 610 and destination device 620, such that entries 650 (e.g., values "A" through "F") may be locally stored therein. For example, a traffic flow from node 11 to node 13 may consist of an average and/or peak traffic rate corresponding to a value "B". Note that more granularity may be obtained so as to only store traffic of a certain type in the matrix 600, where the DIA monitors traffic flows per traffic type, for example, based on Deep Packet Inspection (DPI) techniques. For instance, the DIA may monitor and store all traffic types separately, or else only specific types of traffic flows separately, or only specific types at all. In addition, the DIA may monitor between specific nodes as well, such as known sources and/or known destinations.

Upon detecting that a particular traffic flow of the monitored traffic flows is "of interest," such as having a traffic rate above a given "traffic rate" threshold (e.g., consuming a certain amount of bandwidth: X packets or Y Kbits/s, or X' packets or Y' Kbits/s if the network close to the root is getting congested), the DIA may determine whether the particular traffic flow is above a "path cost" threshold. For example, the path cost threshold may be based on one or more service level agreements (SLAs), which may be specific to the type of flow, specific to particular nodes or node pairs, generic for the entire network, etc.

Figure 7:
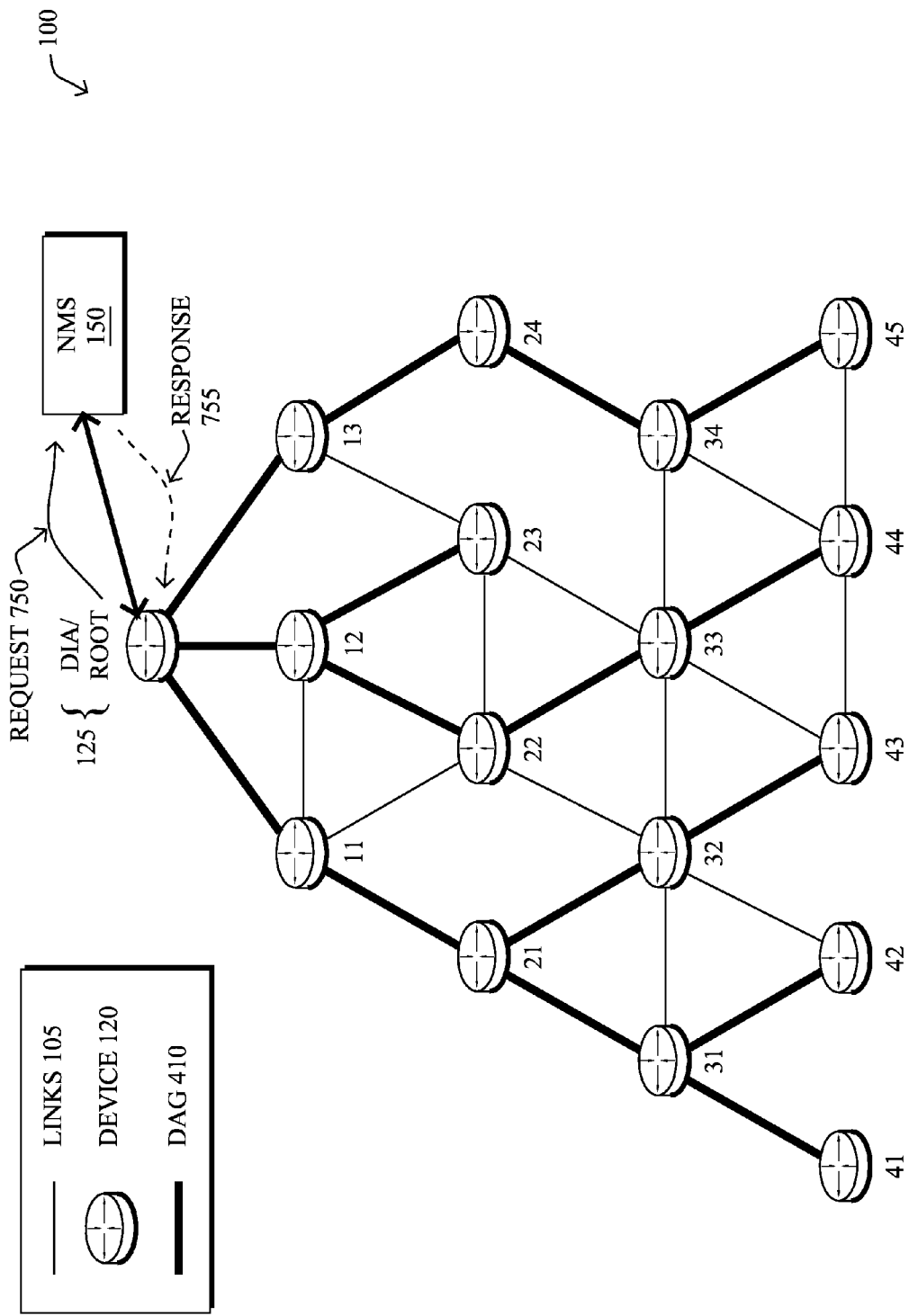
FIG. 7 illustrates an example message exchange.

In one embodiment, the path cost threshold(s) may be proactively and locally pre-configured on the DIA, e.g., according to policy. Conversely, in another embodiment, the SLAs and corresponding path cost threshold(s) may be managed by a management device, such as the NMS 150 (or Central Intelligence Controller or "CIC," etc.). Accordingly, as shown in FIG. 7, the DIA may send a request 750 (e.g., a unicast message) for the particular <source,destination, flow_type> of interest. Based on this flow information, which may be sent generally in response to the particular traffic flow being above the traffic rate threshold, the DIA may receive the path cost threshold (response 755) for the particular traffic flow from the management device in return.

According to illustrative embodiments herein, the path cost threshold may be expressed in terms of a maximum allowed path cost (max_path_cost) from a source device to a destination device, and/or a maximum allowed path cost stretch (max_path_cost_stretch). The maximum allowed path cost stretch is defined as the maximum tolerable path cost increase/difference computed between the current path (a DAG route on the primary DAG 310 from a given source device to a given destination device) and the best available path between the pair of nodes in the network without transiting through the root node (a source-routed route from the given source device to the given destination device).

Figure 8:
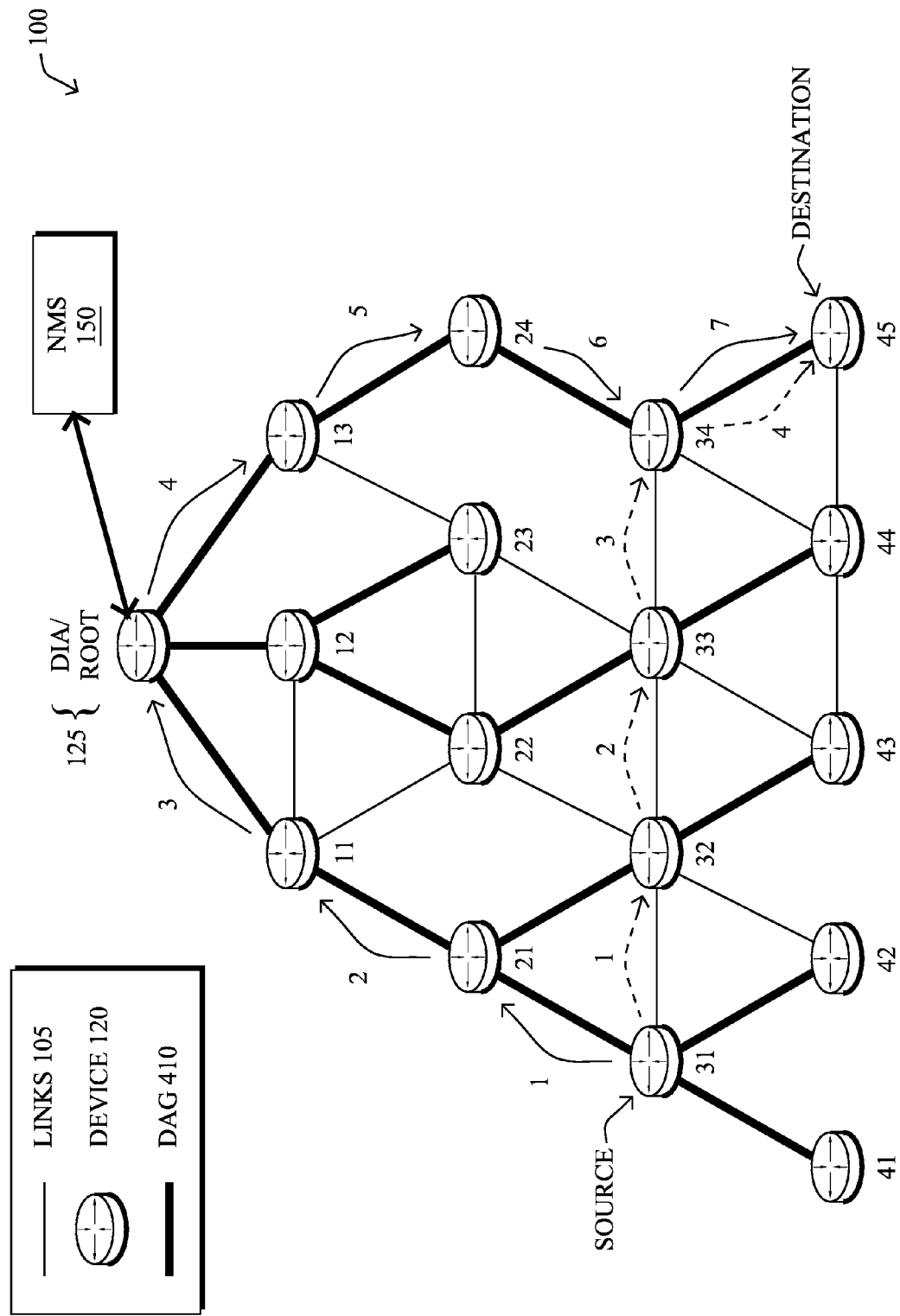
FIG. 8 illustrates an example path cost comparison.

For example, as shown in FIG. 8, assuming that node 31 is sending traffic flow 540 to node 45, the current path cost value may be expressed in terms of a hop-count (e.g., seven hops), or else in some other cost/metric value. If the path cost threshold were, e.g., six hops, then this particular flow would be in violation of that threshold (e.g., that SLA). Alternatively or in addition, if the path cost threshold relates to the path cost stretch, then by computing a best available path (e.g., 31-32-33-34-45) through the network (e.g., a shortest path, such as using a known Disjkstra constraint algorithm from the source node to the destination), the DIA may determine the possible cost (e.g., four hops), and thus the path cost stretch (e.g., three hops, in terms of hop-count). In this instance, if the path cost threshold were, e.g., a stretch of four hops, then this flow from node 31 to node 45 would not be in violation of that threshold. (Note that multiple thresholds may be defined, such that this particular flow may surpass the maximum path cost but not the maximum path cost stretch, accordingly.)

Figure 9A:
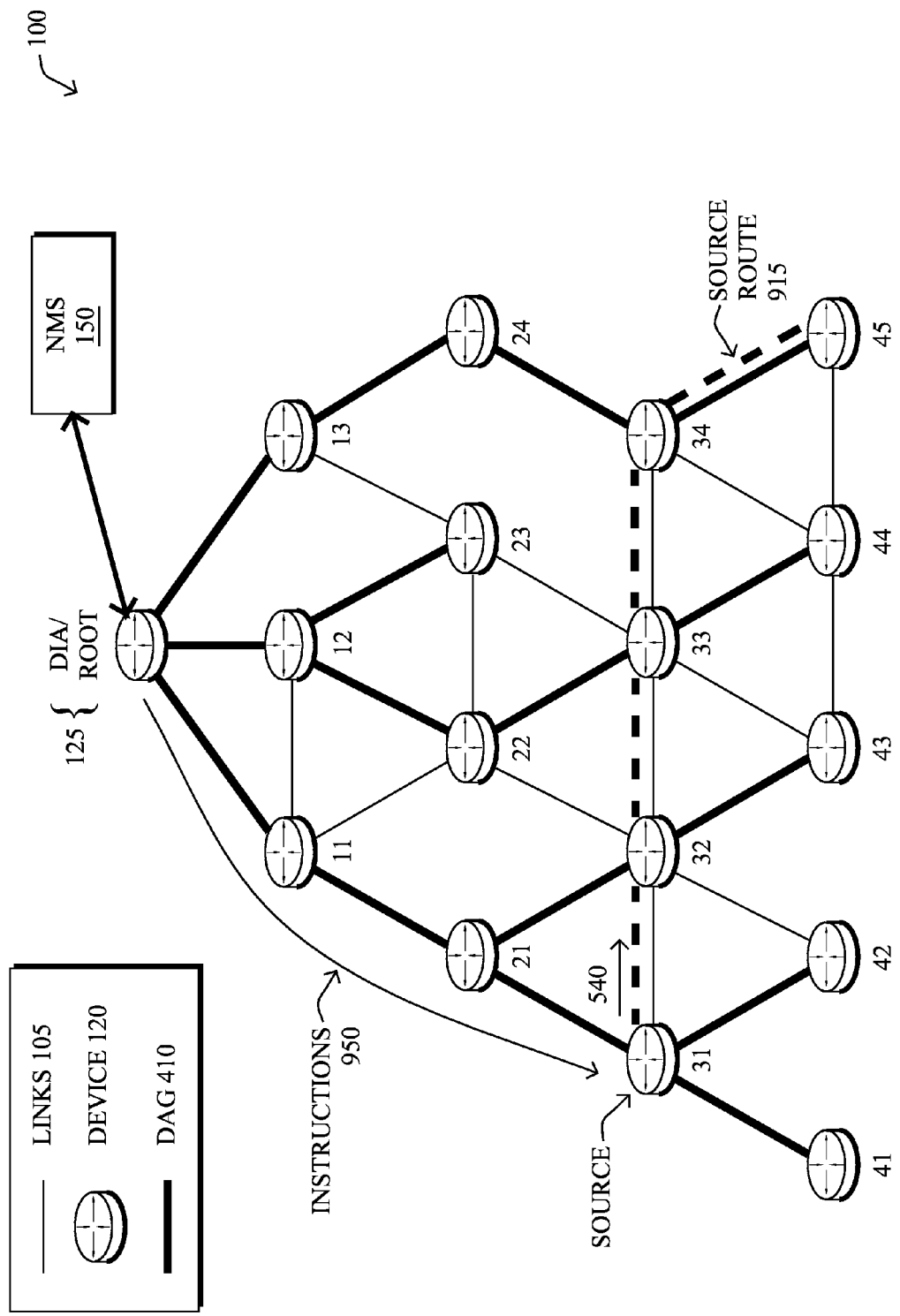
FIGS. 9A-9C illustrate examples of DAG root bypassing.
Figure 9B:
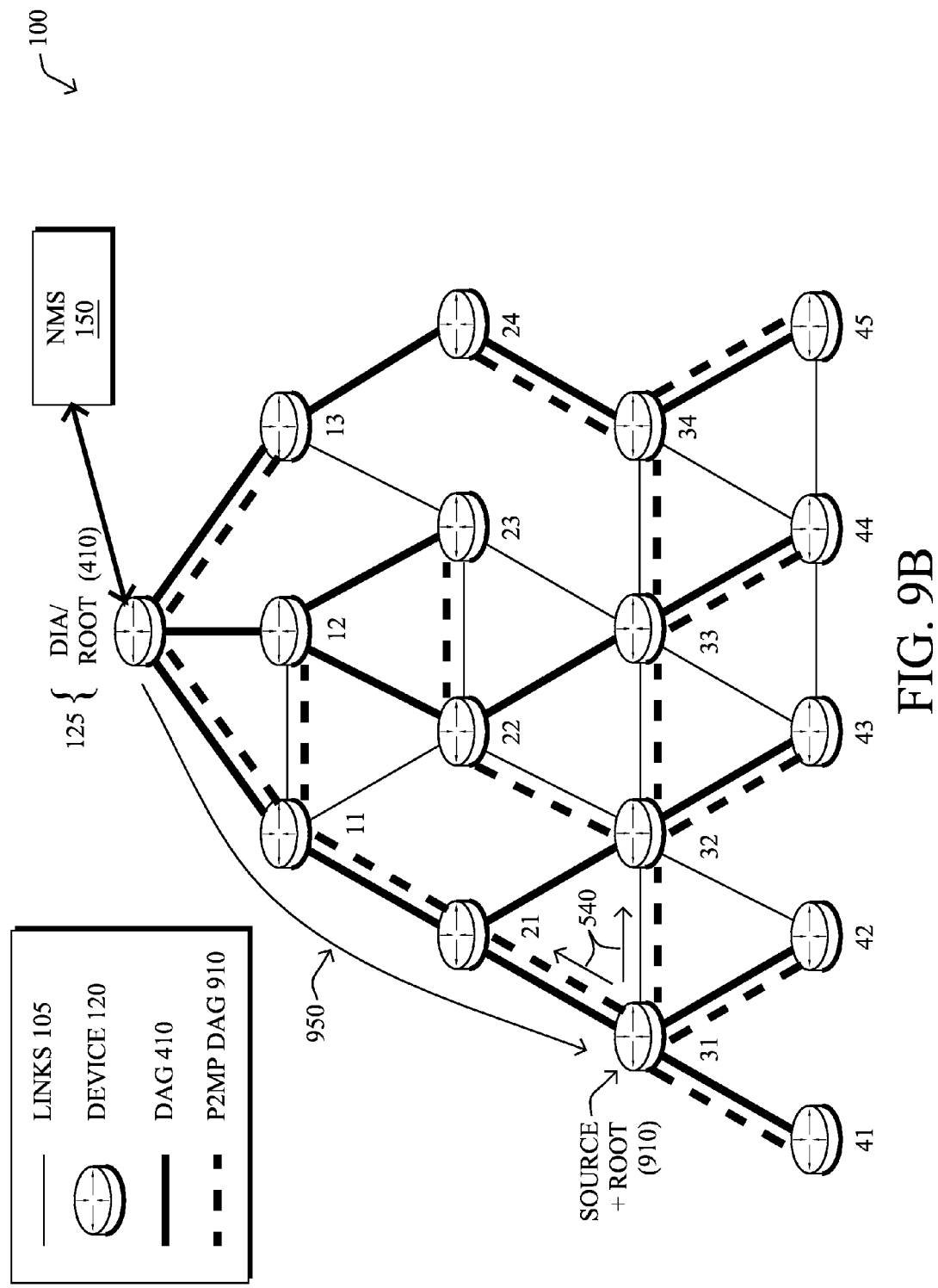
Figure 9C:
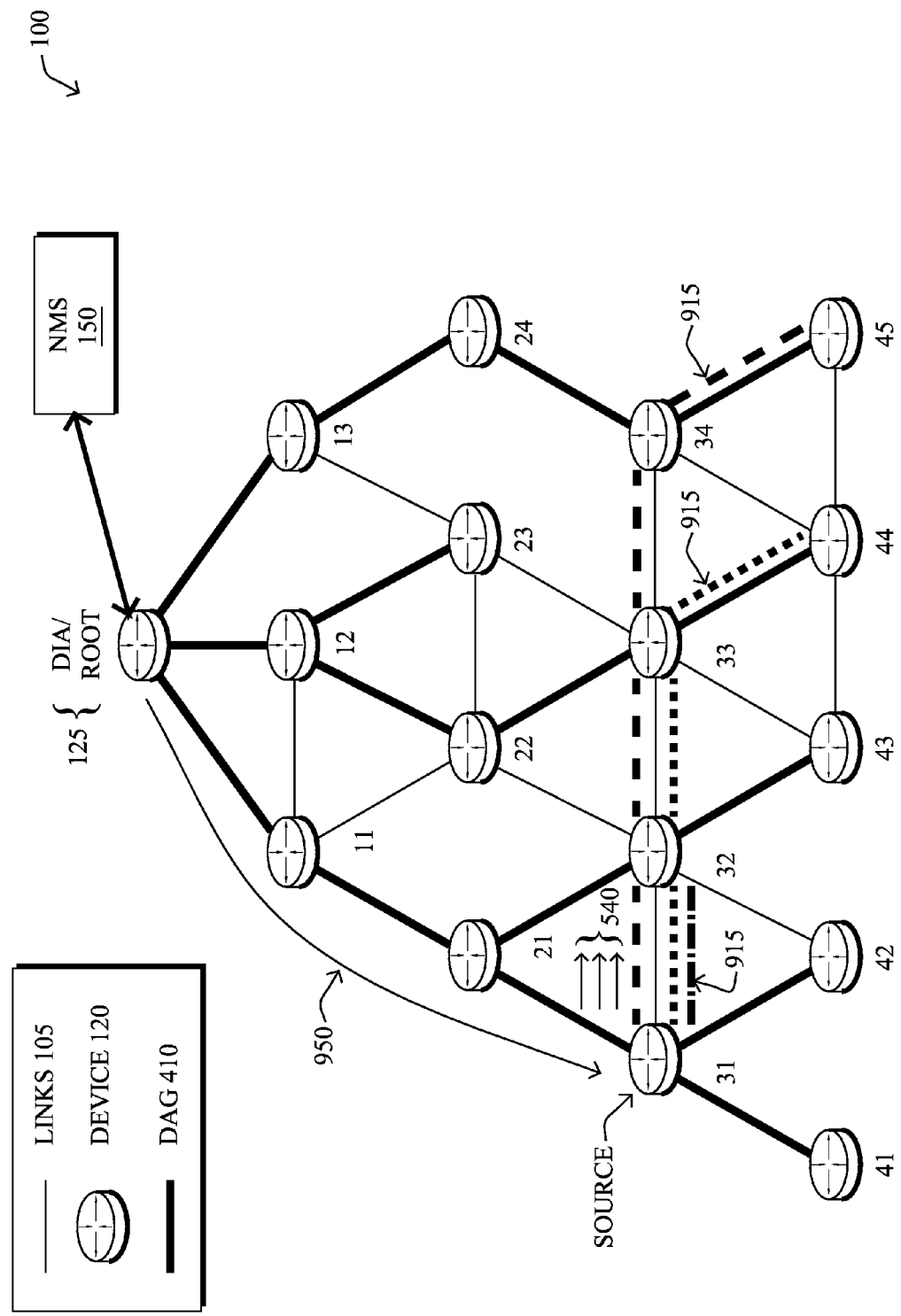

In the event a traffic flow 540 of interest is detected (e.g., a particular type of flow, a particular amount/rate of traffic above the threshold, etc., according to the policy), and that flow violates a (one of the) path cost threshold(s), then the DIA may determine whether the traffic flow 540 between the source and the destination is P2P or P2MP, and may act accordingly, such as shown in FIGS. 9A-9C. In either event, the DIA may send an instruction message 950 (e.g., an IPv6 message) to the source device (e.g., node 31) requesting that the source no longer send traffic destined to the destination (optionally for a specific period of time) using the default hop-by-hop route (e.g., DAG 410) towards the root node, but rather to make use of a new "DAG-root-bypassing" route. Note that the instruction 950 may optionally indicate the specific period of time to use of a direct path or new DAG (described below), such as to continue evaluating whether the bypassing route is still needed.

For instance, as specifically shown in FIG. 9A, in response to the particular traffic flow being P2P, the DIA may computing a source route 915 (e.g., the best available path as computed above), and sends the source route to the source device (e.g., node 31) to cause the source device to use the source route 915 for the particular traffic flow to the destination (e.g., node 45). The source device, that had been sourcing one or more traffic flows through the root node of the primary DAG 410, may then receive the instructions 950, and ceases sourcing the particular traffic flow (e.g., associated with a specific traffic type, or all traffic types), and may start sending traffic 540 to the said destination (optionally for a specific period of time) using the source route 915 computed by the DIA.

Alternatively, as shown in FIG. 9B, in response to the particular traffic flow being P2MP, the instructions 950 may request that the source device act as a root node for a new secondary DAG 910 and to consequently start forming that secondary DAG for use with the particular traffic flow (or, notably, any flow sourced by the source device to any node in the network), in which case the instruction 950 may optionally include DAG properties. In particular, this option may be particularly beneficial in instances where the DIA has determined (from traffic matrix 600) that the source is sending traffic to a number of nodes in the network, in which case a DAG rooted at the source is appropriate. The source device (e.g., node 31) may then receive and act on the instructions, and creates the secondary DAG 910 with itself as the secondary DAG root. All nodes joining the newly formed secondary DAG may then start sending control messages (e.g., DAO messages 300) to the source (the new root node), while still maintaining their connection within the primary DAG 410.

Note that should a secondary DAG be dynamically formed following the DIA's instructions, the secondary DAG root (e.g., source device, node 31) may optionally start monitoring the amount of traffic sent along this DAG, e.g., for the particular traffic flow. If it is detected that the traffic rate falls bellow a traffic rate threshold "T" for a configured length/period of time "P," then the secondary DAG root may decide to tear down the secondary DAG 910, and redirects the particular traffic flow (and any other flow using the secondary DAG) back onto the primary DAG 410. In one specific embodiment, the values of T and P are provided by the DIA, for example, according to the network traffic conditions and node states (e.g., P may be shortened and T increased if the DIA determines that the network is congested or if certain nodes are running out of memory to store the additional routing states).

In still another embodiment, in response to the particular traffic flow being P2MP, the DIA may also send a set of source routes 915 to the source device, should a secondary DAG be less appropriate, for example, if the source sends traffic of interest according the criteria specified above to only a limited number of destinations. In other words, as shown in FIG. 9C, if the P2MP flow is to a number of destinations below a "DAG creation" threshold, the DIA may compute and sending a plurality of source routes 915 to the source device to cause the source device to use the plurality of source routes to reach the destinations (e.g., from node 31 to nodes 32, 44, and 45, respectively) for the particular traffic flow, instead of creating the secondary DAG.

Figure 10:
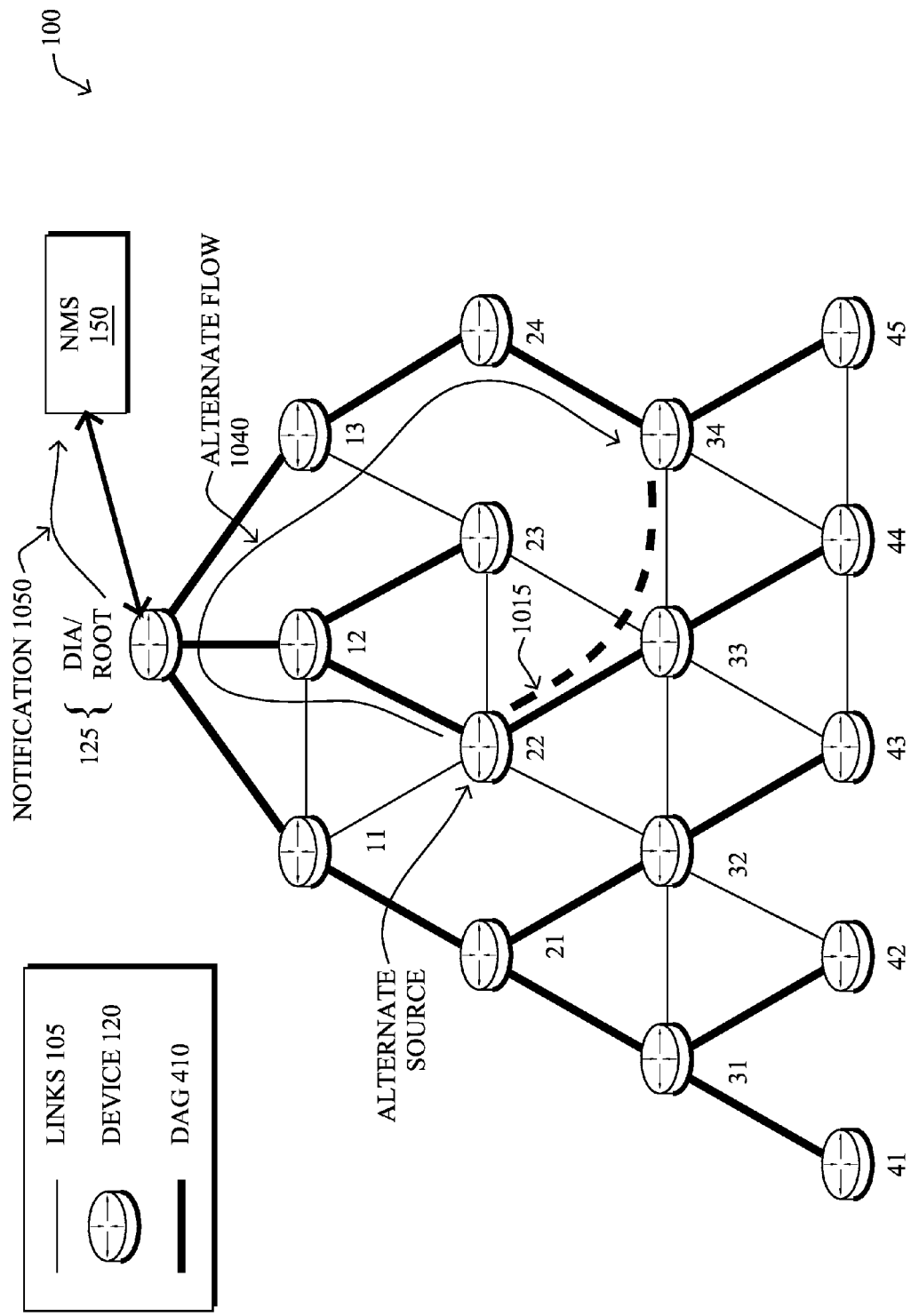
FIG. 10 illustrates another example of DAG root bypassing.

According to one or more additional embodiments herein, there may be situations where the DIA discovers that the SLA (specifically, the path cost threshold) cannot be met for a particular traffic flow by using the best available path source route 915 or the secondary DAG 910. If this is the case, as shown in FIG. 10, a notification message 1050 may be sent to the management device (e.g., CIC/NMS 150) reporting that the SLA cannot be met in the network, and there is no existing path available that can meet the requirements (the path cost threshold). In one specific embodiment, the DIA may also (or may alternatively) consult the traffic matrix 600 to determine if there are any other traffic flows (e.g., lower priority traffic flows) that can be moved (rerouted) off of the primary DAG 410 to allow for the particular traffic flow in question to meet the SLA requirements. In particular, if the DIA does find another candidate (e.g., a lower-priority traffic flow), it then calculates another source-routed path 1015 for this lower priority flow (e.g., flow 1040 from node 22 to node 34), and sends instructions to the source device of this alternate flow 1040 (node 22) requesting that the source use the specified path instead of transiting through the root node, similar to the technique described above. In this manner, traffic patterns of other flows within the network may be altered in order to potentially allow the original flow (e.g., flow 540) to meet the SLA requirements. If the DIA still cannot find a candidate flow that can be rerouted, it may sends a notification 1050 to the management device reporting this, as well.

Figure 11A:
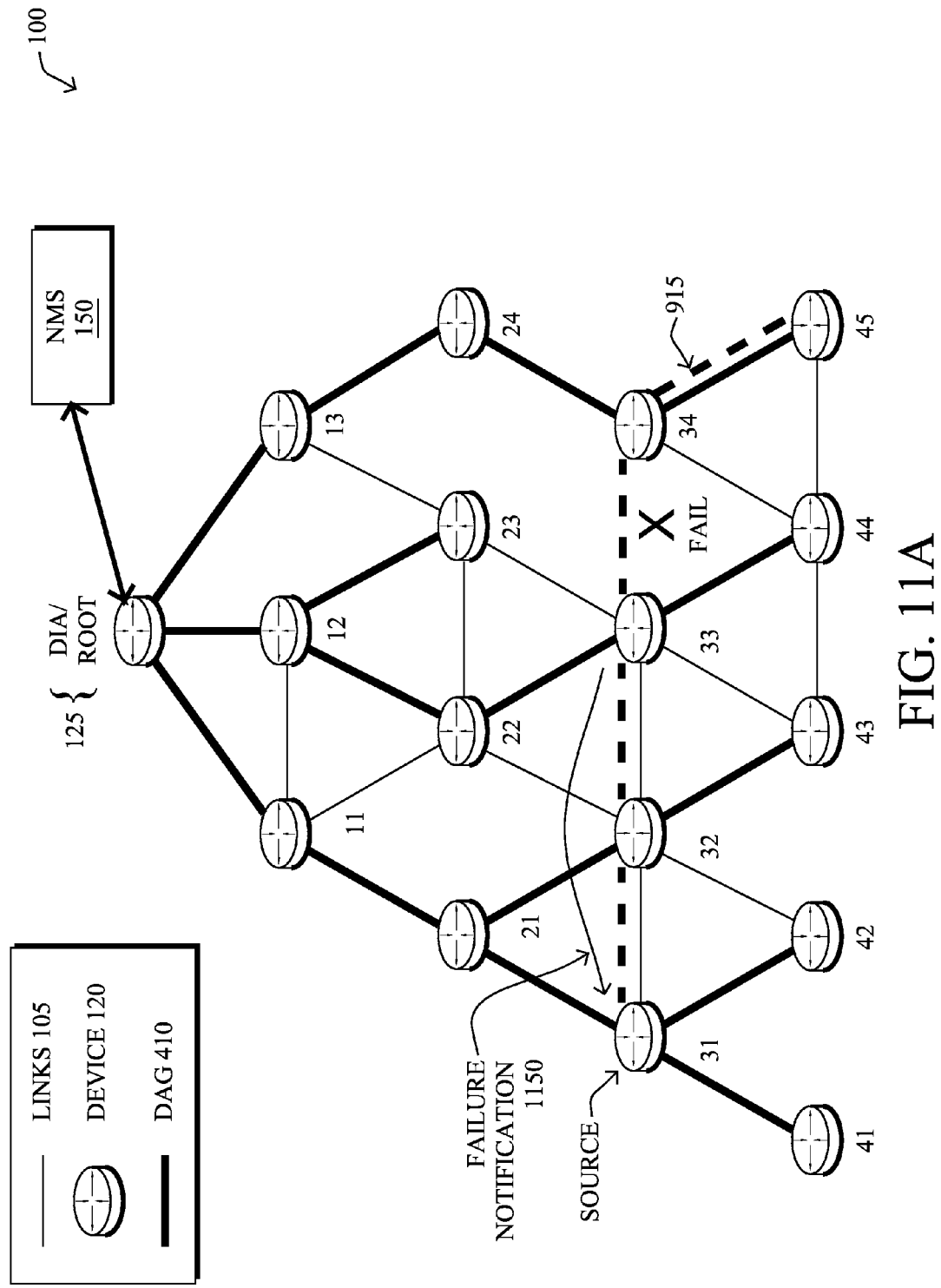
FIGS. 11A-11C illustrate an example of source route failure management.
Figure 11B:
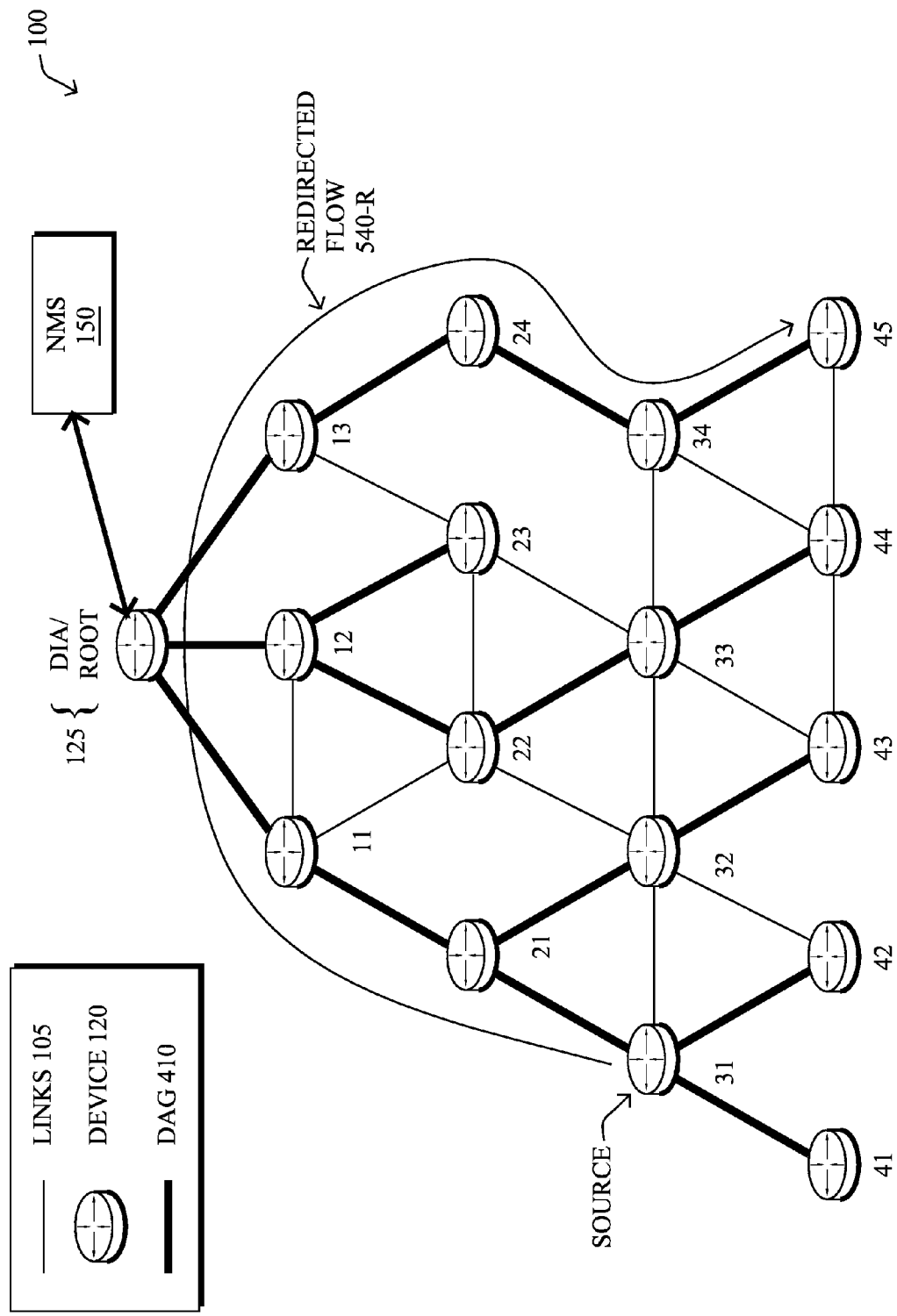
Figure 11C:
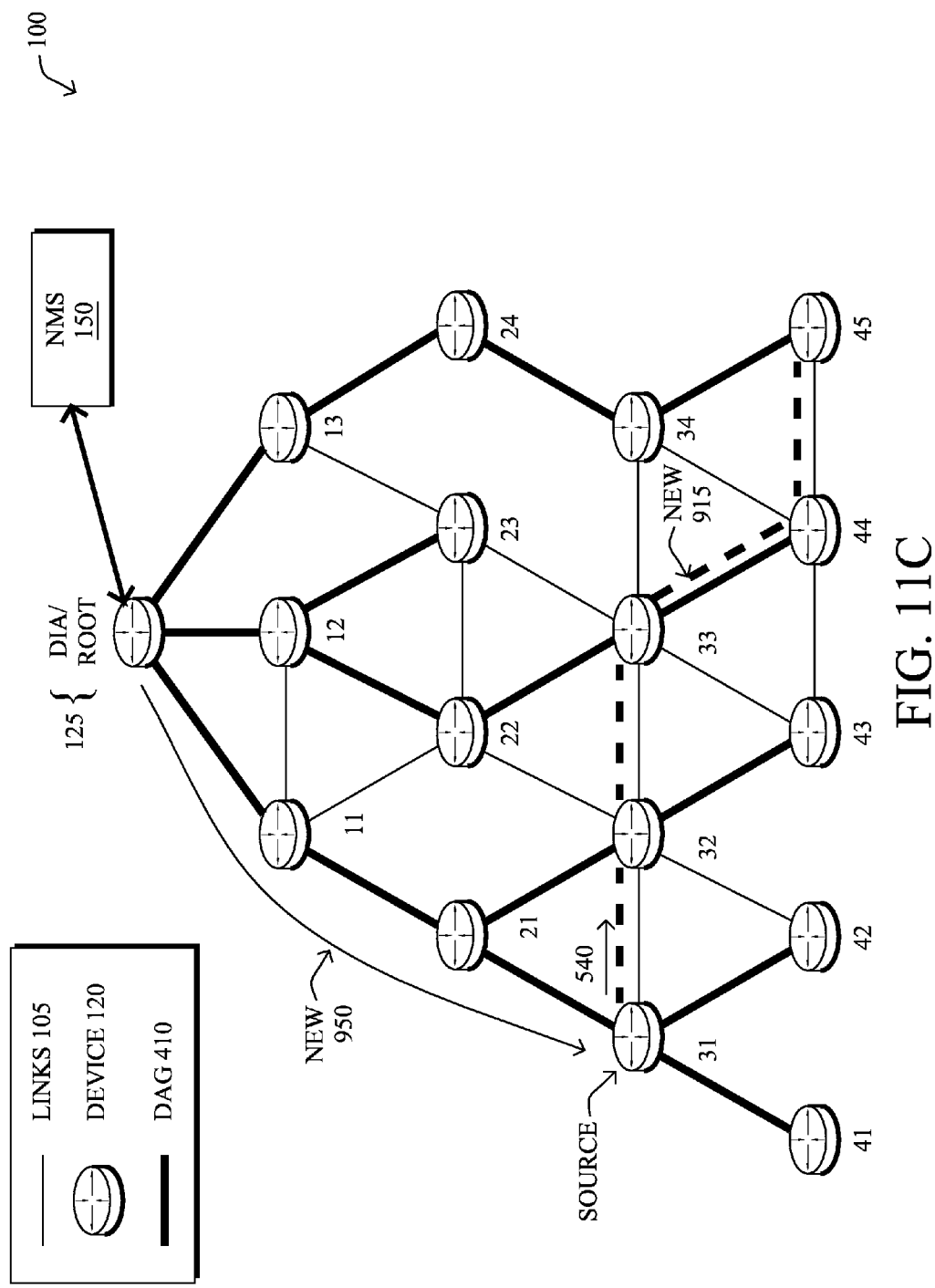

Notably, paths are also subject to failures, particularly in LLNs (e.g., permanent or transient). As shown in FIG. 11A, if a source device is required to use a source route 915 for a destination (thus without transiting through the root node), and the source route provided by the DIA fails (e.g., at link 33-34), upon receiving a failure notification 1150 (e.g., an ICMP error message) from the node upstream to the failure (e.g., node 33), thus detecting a failure of the source route for the particular traffic flow, the source device may then redirect its traffic onto the primary DAG 410 (via the root node), as shown in FIG. 11B. Note that when using the previous route through the root node, the source device may set a specified flag (e.g., an "R" flag in the hop-by-hop IPv6 routing header) to indicate a failure of the source route within the traffic, now denoted as "540-R."

Upon receiving a data packet with the R flag set (in redirected traffic 540-R) on the primary DAG 410 at the root node, the DIA is informed that a previously computed is source route 915 has failed (e.g., as it is the root itself, or else from a notification from the root). Accordingly the DIA may decide to determine if any action is necessary based on traffic observation as described above, or else may decide to proactively compute an alternate source route, that is, a best available path once the network topology has been updated, and then inform the source device (instructions 950) of the newly computed source route 915 to the destination (e.g., via path 33-44-45 to bypass the failure). Note that in the case of a newly formed secondary DAG hosted at the source device, path failures may be handled using the corresponding procedures of the underlying routing protocol.

Figure 12A:
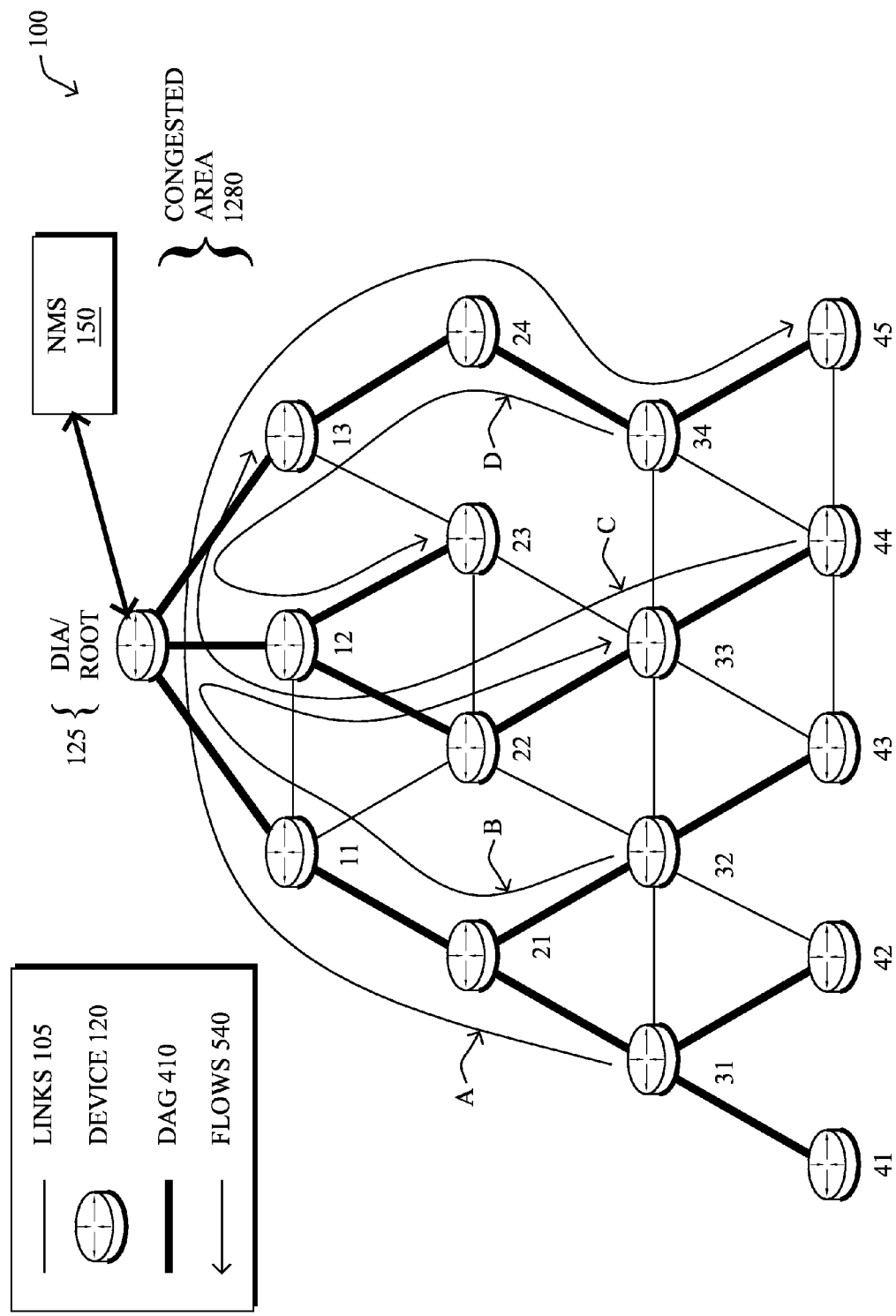
FIGS. 12A-12B illustrate an example of congestion management through DAG root bypassing.
Figure 12B:
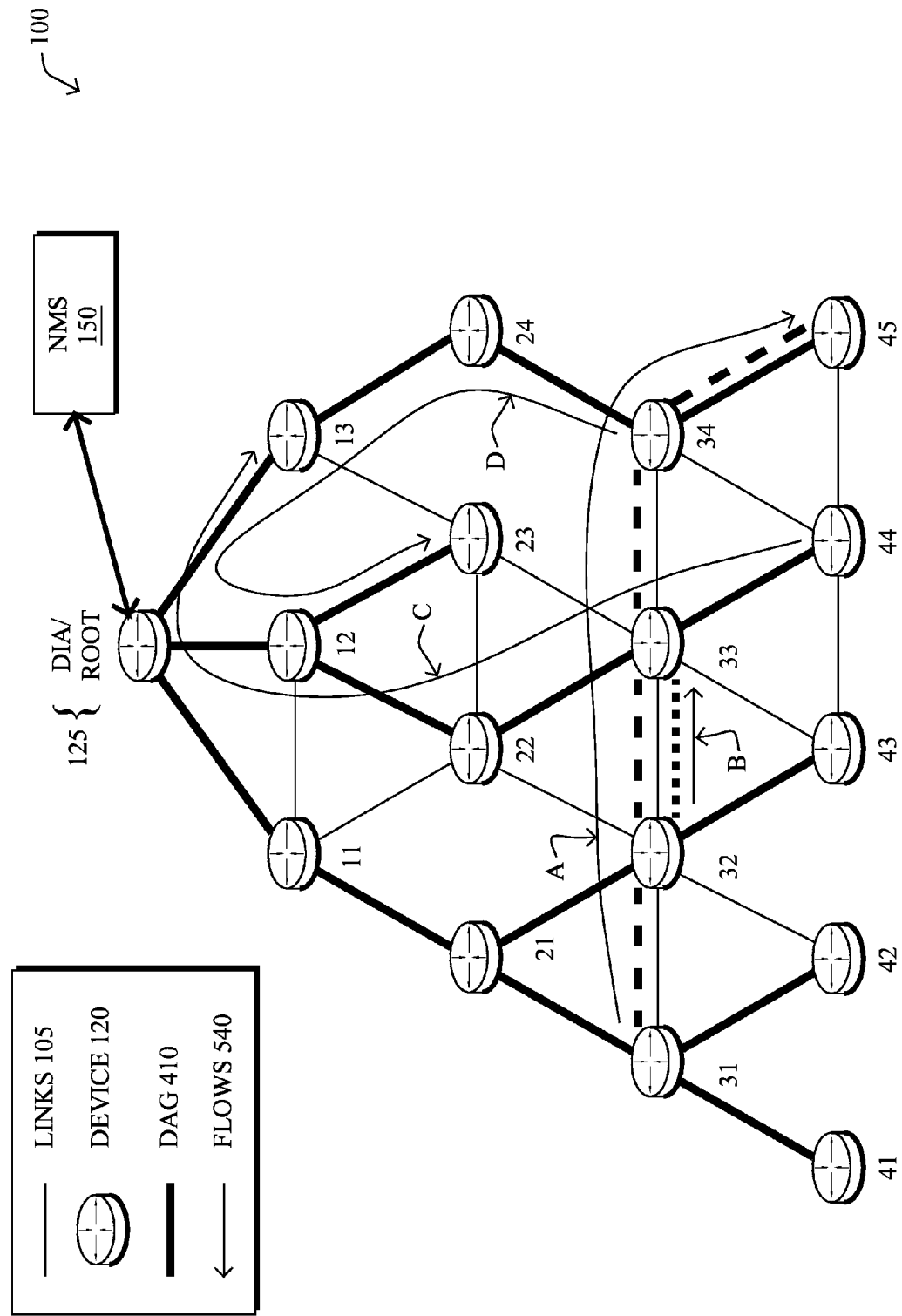

In yet another embodiment, another trigger to establish DAG root bypassing may be detection of a locally congested area of the primary DAG 410. For example, as shown in FIG. 12A, the area 1280 close to the root node is commonly congested (a condition that is orthogonal to flows surpassing path cost thresholds). Upon detecting a level of congestion of the primary DAG near the root node that surpasses a congestion threshold, therefore, the DIA may also compute and send one or more source routes 915, as shown, in FIG. 12B, or else may instruct source devices to create secondary DAGs 910. In other words, though the techniques above specifically pinpoint individual flows, the additional functionality described with reference to FIGS. 12A-12B provide for gains to be achieved when the overall collection of traffic flows (e.g., labeled as "A" through "D") is problematic, and not any one (or more) particular flows. By redirecting certain flows, e.g., such as the highest "offenders" of traffic utilization and/or those flows that have the greatest path cost gain that could be achieved (e.g., flows "A" and "B"), their relocation may be made for the greater good of the network to alleviate the congestion 1280.

Figure 13:
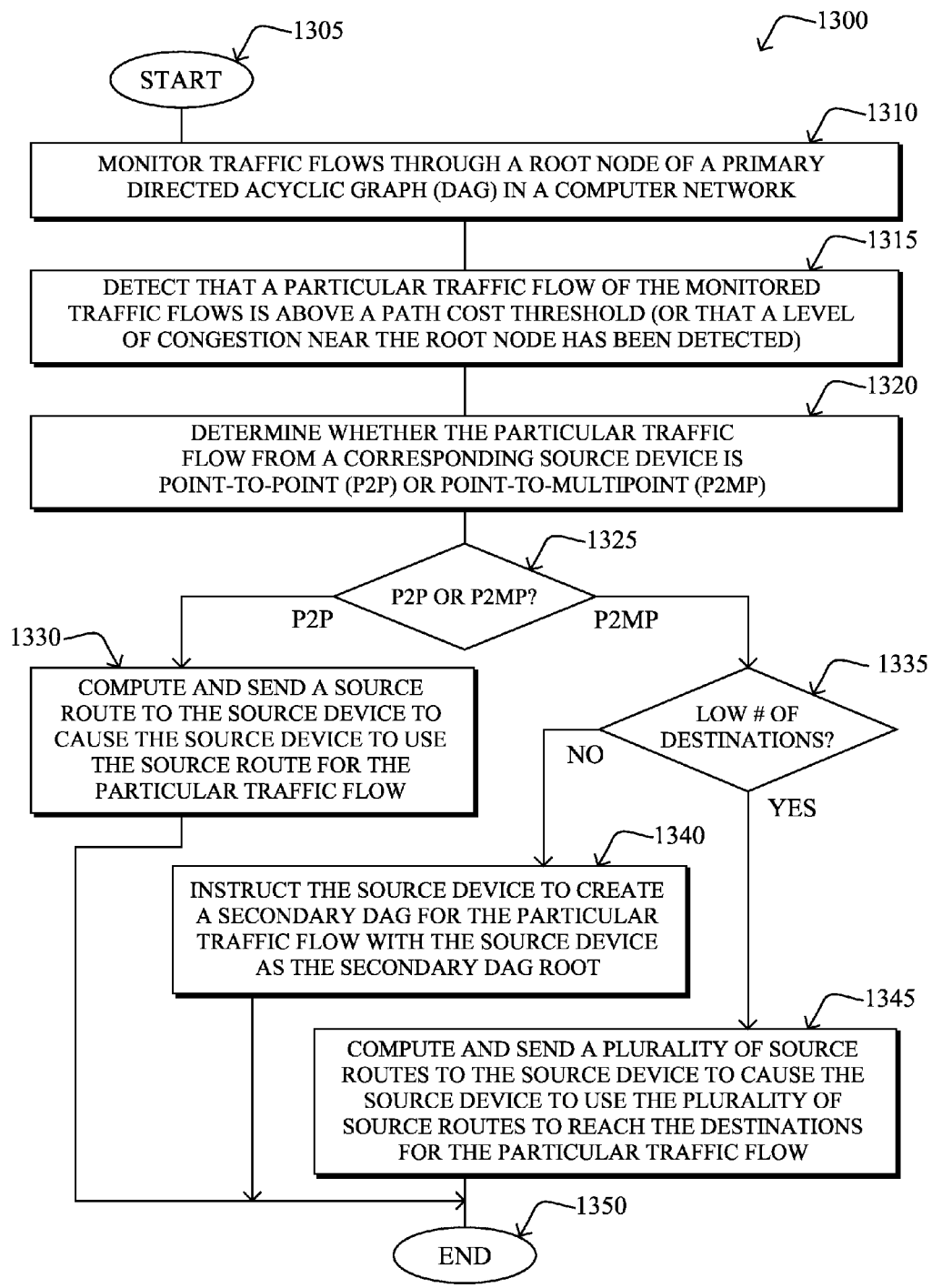
FIG. 13 illustrates an example simplified procedure for dynamic DAG root bypass in accordance with one or more embodiments described herein, particularly from the perspective of a distributed intelligence agent (DIA) (e.g., a root node)

FIG. 13 illustrates an example simplified procedure for dynamic DAG root bypass in accordance with one or more embodiments described herein, particularly from the perspective of a DIA (e.g., the root). The procedure 1300 starts at step 1305, and continues to step 1310, where, as described in greater detail above, the DIA monitors traffic flows 540 through a root node (e.g., itself, or a separate device) of a primary DAG 410 in a computer network 100, and may detect in step 1315 that a particular traffic flow of the monitored traffic flows is above a configured path cost threshold. For example, as described above, the path cost threshold may be a maximum path cost, a maximum path cost stretch, or other values which may (or may not) be based on a corresponding SLA. Note also that in step 1315, as an alternative to any one particular traffic flow being over the threshold, the DIA may also detect a high level of congestion near the root node, as mentioned above.

In response to threshold being surpassed by a particular flow (or general congestion), in step 1320 the DIA may first determine whether the particular traffic flow (or a selected flow for congestion) from a corresponding source device is P2P or P2MP. If the decision in step 1325 is that the flow is P2P, then in step 1330 the DIA computes and sends a source route 915 to the source device (e.g., node 31) to cause the source device to use the source route for the particular traffic flow (e.g., to destination node 45). Alternatively, if in step 1325 the flow is a P2MP flow, then in step 1335 the DIA may also proceed based on whether there are too low a number of destinations to merit a new DAG in the network. If a new DAG is, in fact, merited in step 1335, then in step 1340 the DIA instructs the source device (e.g., node 31) to create a secondary DAG 910 for the particular traffic flow 540 with the source device as the secondary DAG root. On the other hand, if in step 1335 there is not sufficient basis to form a new DAG, then in step 1345 the DIA may compute and send a plurality of source routes 915 to the source device to cause the source device to use the plurality of source routes to reach the destinations for the particular traffic flow (e.g., nodes 32, 44, and 45). The illustrative procedure 1300 may then end in step 1350, notably with the ability to return to step 1310 to continue monitoring the network, or other steps as suitable.

Figure 14:
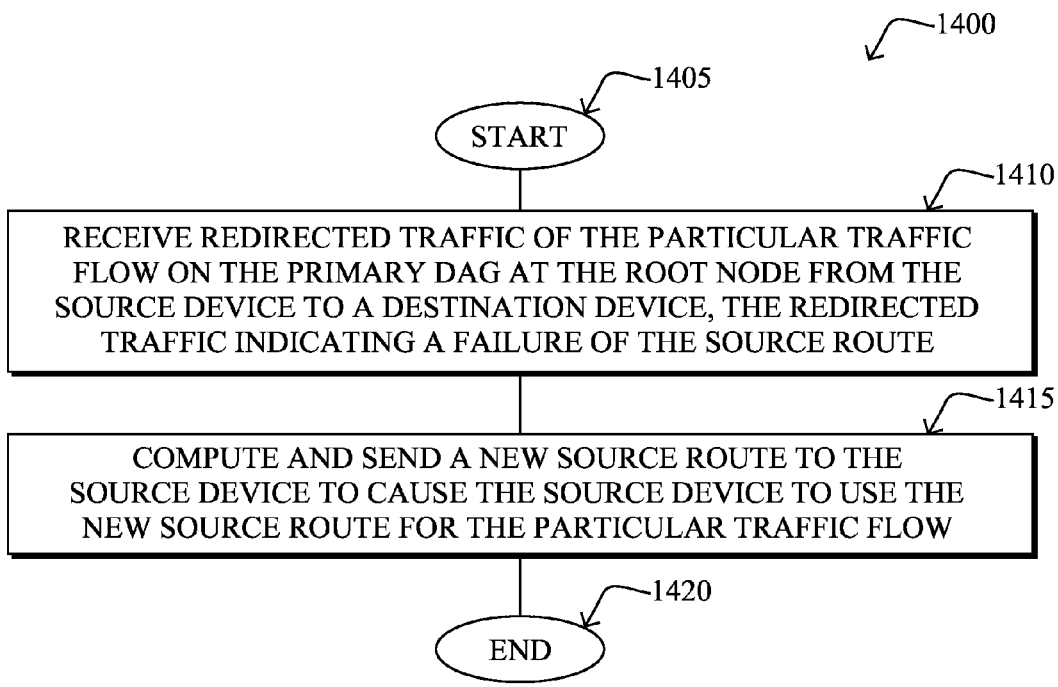
FIG. 14 illustrates another example simplified procedure for dynamic DAG root bypass in accordance with one or more embodiments described herein, particularly from the perspective of a DIA when a source route fails.

In addition, FIG. 14 illustrates another example simplified procedure for dynamic DAG root bypass in accordance with one or more embodiments described herein, particularly from the perspective of a DIA when a source route fails. The procedure 1400 may start at step 1405, and continues to step 1410, where, as described in greater detail above, the root node receives redirected traffic 540-R of the particular traffic flow on the primary DAG from the source device (e.g., node 31) to a destination device (e.g., node 45), the redirected traffic indicating a failure of the source route. As such, in step 1415, the DIA (detecting this indication from the root, or else acting as the root) computes and sends a new source route 915 to the source device to cause the source device to use the new source route for the particular traffic flow, accordingly. The procedure 1400 for failure management may then end in step 1420.

Figure 15:
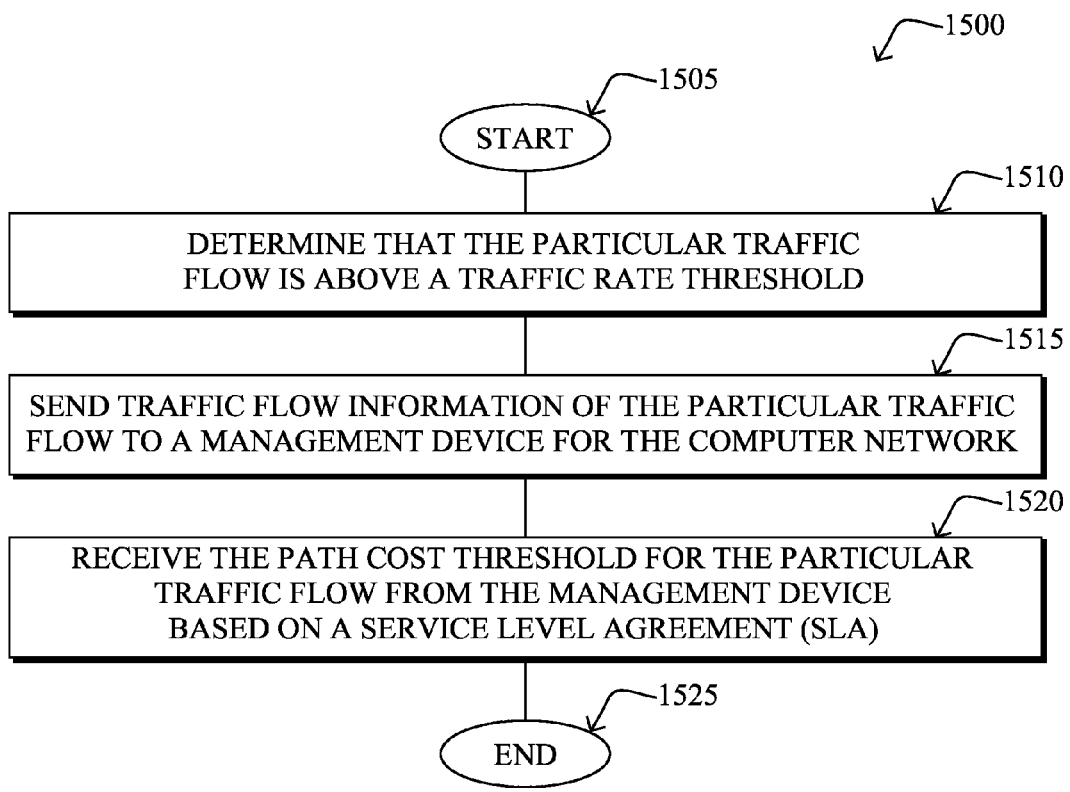
FIG. 15 illustrates still another example simplified procedure for dynamic DAG root bypass in accordance with one or more embodiments described herein, particularly from the perspective of a DIA for requesting the path cost threshold from a management device.

FIG. 15 illustrates still another example simplified procedure for dynamic DAG root bypass in accordance with one or more embodiments described herein, particularly from the perspective of a DIA for requesting the path cost threshold from a management device (an optional embodiment). That is, the procedure 1500 may start at step 1505, and continues to step 1510, where, as described in greater detail above, the DIA may determine that the particular traffic flow 540 is above a traffic rate threshold (e.g., is "of interest"). Accordingly, in step 1515, the DIA may send traffic flow information of the particular traffic flow to a management device (e.g., NMS 150, CIC, etc.), and may subsequently receive the path cost threshold for the particular traffic flow in step 1520 from the management device based on an SLA. The procedure 1500 may then end in step 1525, notably returning to procedure 1300 of FIG. 13 to process the particular traffic flow according to the determined path cost threshold.

Figure 16:
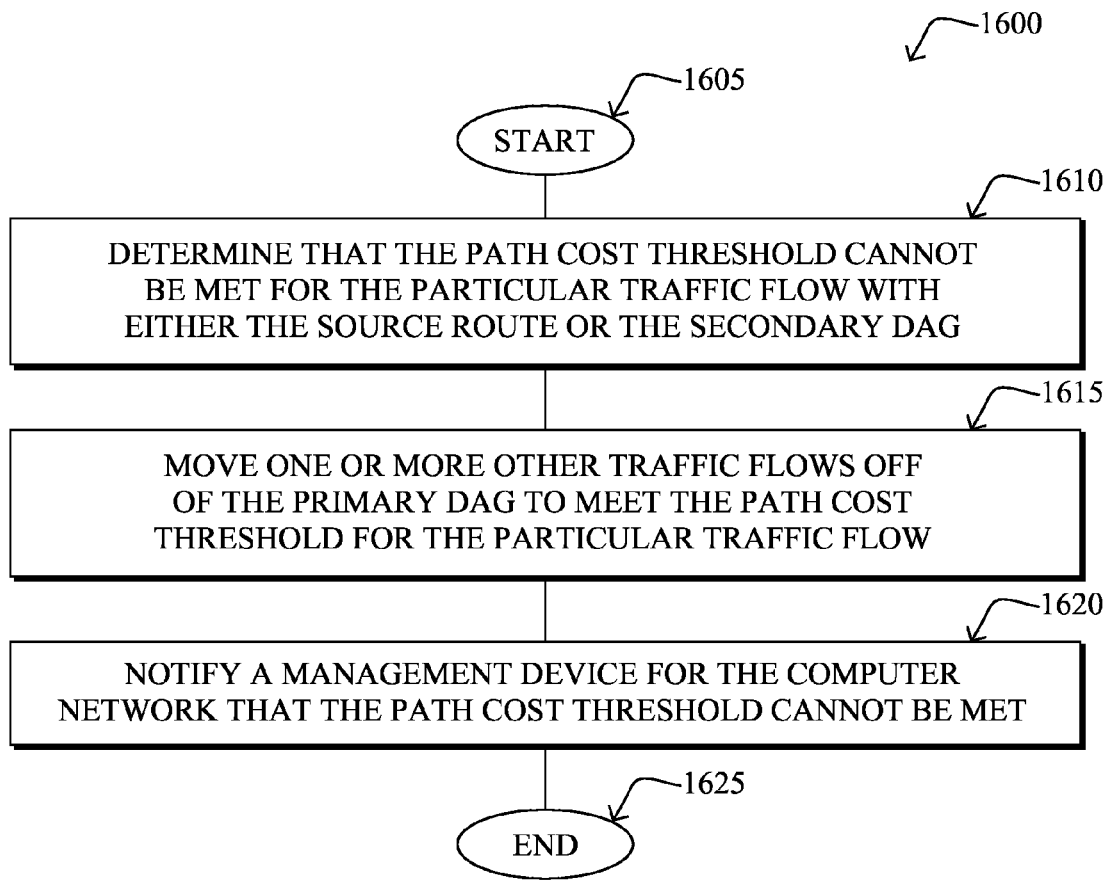
FIG. 16 illustrates another example simplified procedure for dynamic DAG root bypass in accordance with one or more embodiments described herein, particularly from the perspective of a DIA when moving the traffic flow alone does not meet the path cost threshold.

Moreover, FIG. 16 illustrates another example simplified procedure for dynamic DAG root bypass in accordance with one or more embodiments described herein, particularly from the perspective of a DIA when moving the traffic flow alone does not meet the path cost threshold. For instance, as described in greater detail above, the procedure 1600 may start at step 1605, and continues to step 1610, where, the DIA may determine that the path cost threshold cannot be met for the particular traffic flow with either the source route or the secondary DAG for various reasons detailed above. As such, in step 1615, the DIA may attempt to move one or more other traffic flows off of the primary DAG to meet the path cost threshold for the particular traffic flow as also described above. In addition (or as an alternative), in step 1620 the DIA may notify a management device (e.g., NMS 150 through notification 1050) that the path cost threshold cannot be met, notably either before attempting to move other flows, or after failing to move other flows (as shown). The simplified procedure 1600 may then end in step 1625.

Figure 17:
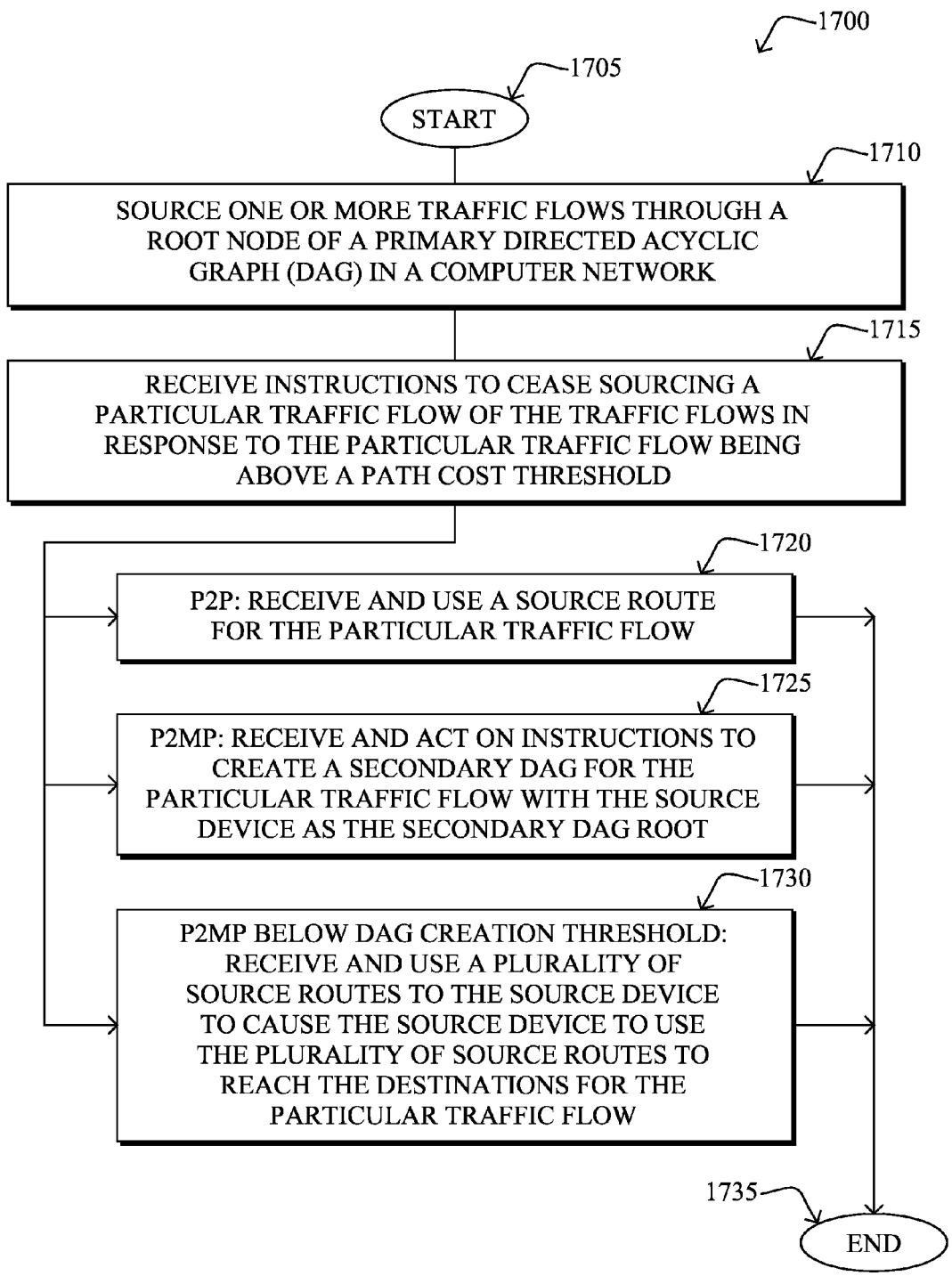
FIG. 17 illustrates an example simplified procedure for dynamic DAG root bypass in accordance with one or more embodiments described herein, particularly from the perspective of a source device.

Conversely, FIG. 17 illustrates an example simplified procedure for dynamic DAG root bypass in accordance with one or more embodiments described herein, particularly from the perspective of a source device. The procedure 1700 may start at step 1705, and continues to step 1710, where, as described in greater detail above, a source node/device (e.g., node 31) may source one or more traffic flows 540 through a root node of a primary DAG 310. As detailed herein, in step 1715, the source device may correspondingly receive instructions (from the DIA/root) to cease sourcing a particular traffic flow of the traffic flows in response to the particular traffic flow being above a path cost threshold. Based on whether the particular traffic flow was a P2P flow, a P2MP flow that merits a new DAG, or a P2MP flow that does not merit a new DAG, the procedure 1700 may proceed to any of steps 1720-1630 as directed by the DIA/root node as described above. In particular, in step 1720, for P2P flows, the source device may receive and use a source route 915 for the particular traffic flow. Alternatively, in step 1725 for a first P2MP option, the source device may receive and act on instructions to create a secondary DAG 910 for the particular traffic flow with the source device as the secondary DAG root. Lastly, in step 1730 for a second P2MP option, e.g., where the flow rate is below a DAG creation threshold, the source device may receive and use a plurality of source routes to the source device to cause the source device to use the plurality of source routes 915 to reach the destinations for the particular traffic flow, as described above. The illustrative procedure 1700 may then end in step 1735, notably with the option of continuing to source the traffic flows over their corresponding routes, or else to proceed as described in procedures 1800-1900 of FIGS. 18-19 below.

Figure 18:
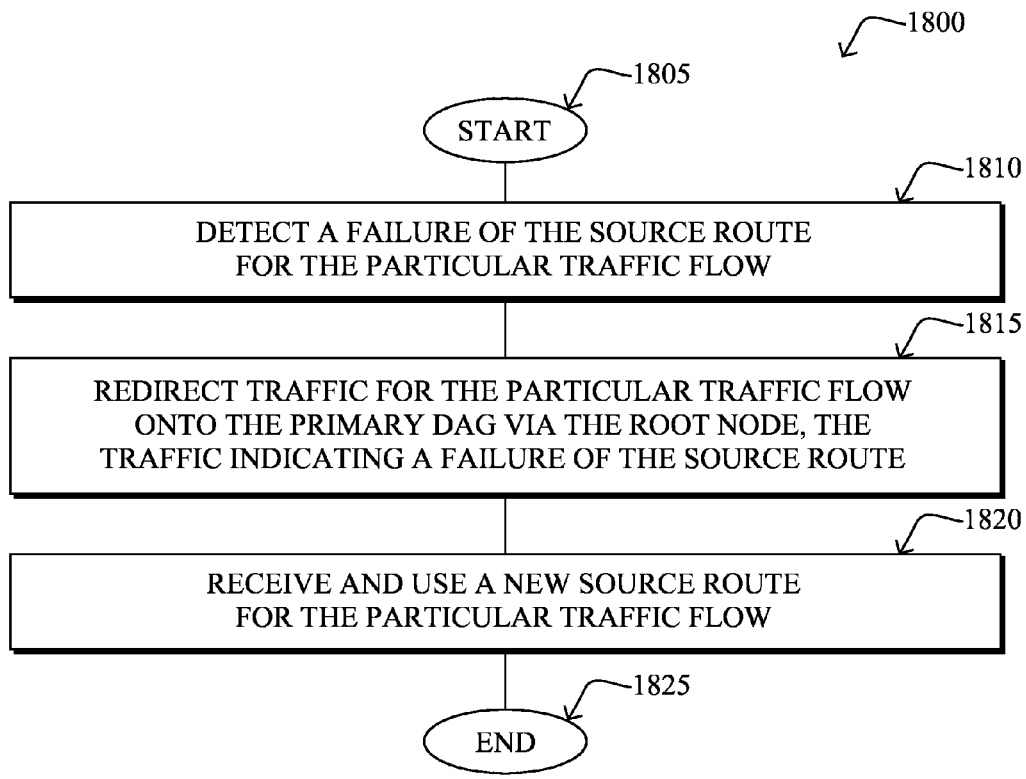
FIG. 18 illustrates another example simplified procedure for dynamic DAG root bypass in accordance with one or more embodiments described herein, particularly from the perspective of a source device when a source route fails.

Additionally, that is, FIG. 18 illustrates another example simplified procedure for dynamic DAG root bypass in accordance with one or more embodiments described herein, particularly from the perspective of a source device when a source route fails. The procedure 1800 may start at step 1805, and continues to step 1810, where, as described in greater detail above, the source device (e.g., node 31) detects a failure of the source route 915 for the particular traffic flow (e.g., at node 33). As such, in step 1815, the source device may redirect traffic 540-R for the particular traffic flow onto the primary DAG via the root node, the traffic indicating a failure of the source route. In time, in step 1820, the source device may then receive and use a new source route for the particular traffic flow (if available), and the illustrative procedure 1800 ends in step 1825.

Figure 19:
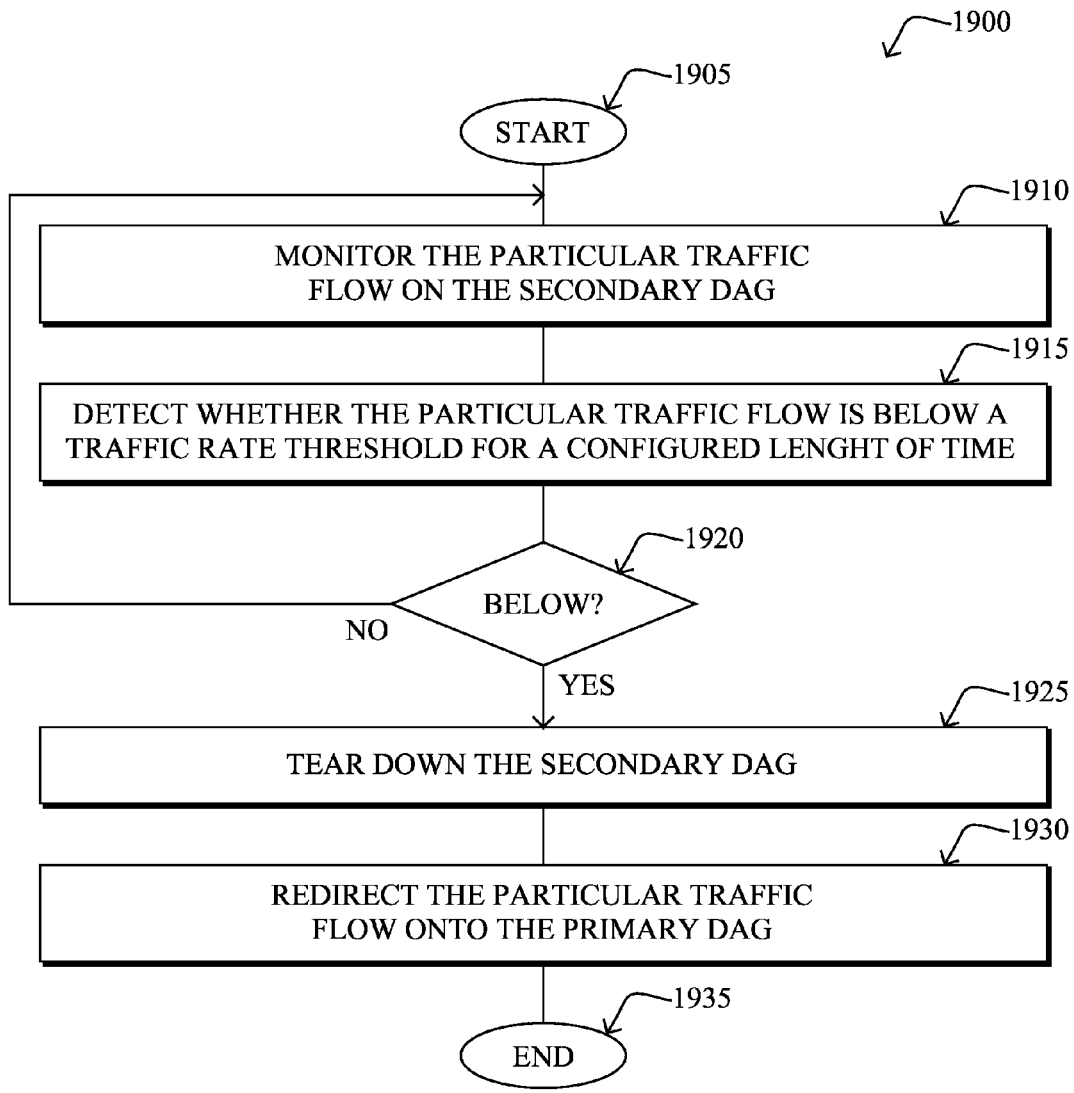
FIG. 19 illustrates another example simplified procedure for dynamic DAG root bypass in accordance with one or more embodiments described herein, particularly from the perspective of a source device managing a secondary DAG.

Lastly, FIG. 19 illustrates another example simplified procedure for dynamic DAG root bypass in accordance with one or more embodiments described herein, particularly from the perspective of a source device managing a secondary DAG. The procedure 1900 may start at step 1905, and continues to step 1910, where, as described in greater detail above, the source device monitors the particular traffic flow 540 on the secondary DAG 910 to detect in step 1915 whether the particular traffic flow is below a traffic rate threshold for a configured length of time (or, said differently, that the particular traffic is no longer above the threshold). If it is determined in step 1920 that the traffic rate is below the threshold (e.g., for a configured length of time), then in step 1925 the source device may tear down the secondary DAG 910. As such, the source device may then redirect the particular traffic flow onto the primary DAG 410 in step 1930, and the procedure 1900 ends in step 1935. Otherwise, the source device may continue to monitor and utilize the secondary DAG 910. (Note that FIG. 19 may also be applied to direct P2P routes, as well.)

It should be noted that while certain steps within procedures 1300-1900 may be optional as described above, the steps shown in FIGS. 13-19 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1300-1900 are described separately, certain steps from each procedure may be incorporated into each other procedure, and the procedures are not meant to be mutually exclusive.

The techniques described herein, therefore, provide for dynamic DAG root bypass in a computer network. In particular, the techniques herein alleviate the issue of sub-optimal (and potentially unacceptable) paths in source-routed, non-storing networks with P2P or P2MP traffic transiting through the root node, so as to meet SLA requirements of these flows. That is, the techniques herein push instructions to source devices (e.g., source routes and/or new DAG instructions) in order to avoid the root node (e.g., or a congested area near the root node) in favor of a more direct route to the destination(s), and to thus reduce an associated path cost of traversing the DAG to the root for the associated traffic flow(s).

While there have been shown and described illustrative embodiments that provide for dynamic DAG root bypass in a computer network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks. In addition, while certain protocols are shown, such as RPL, other suitable distance-vector-based (e.g., DAG-based) protocols where traffic traverses a root node may be used, accordingly. Notably, while the techniques are particularly useful for source-routing non-storing networks, the embodiments herein are not so limited, and may be used with any distance-vector-based networks that would benefit from bypassing the associated root node. Also, it is worth reminding that while the techniques generally describe the distributed intelligence agent (DIA) as the root node itself, other separate devices (e.g., a dedicated DIA within the DAG network, a head-end node, an NMS, a CIC, etc.) may also be used to provide intelligence to the network monitoring and/or directing functions described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   monitoring traffic flows through a root node of a primary directed acyclic graph (DAG) in a computer network;
   detecting that a particular traffic flow of the monitored traffic flows is above a path cost threshold;
   determining whether the particular traffic flow from a corresponding source device is point-to-point (P2P) or point-to-multipoint (P2MP);
   in response to the particular traffic flow being P2P, computing and sending a source route to the source device to cause the source device to use the source route for the particular traffic flow; and
   in response to the particular traffic flow being P2MP, instructing the source device to create a secondary DAG for the particular traffic flow with the source device as the secondary DAG root.

2. The method as in claim 1, further comprising:
   in response to the particular traffic flow being P2MP to a number of destinations below a DAG creation threshold, computing and sending a plurality of source routes to the source device to cause the source device to use the plurality of source routes to reach the destinations for the particular traffic flow instead of creating the secondary DAG.

3. The method as in claim 1, further comprising:
receiving redirected traffic of the particular traffic flow on the primary DAG at the root node from the source device to a destination device, the redirected traffic indicating a failure of the source route; and
in response, computing and sending a new source route to the source device to cause the source device to use the new source route for the particular traffic flow.

4. The method as in claim 1, further comprising:
instructing the source device to use the source route or the secondary DAG for a period of time.

5. The method as in claim 1, wherein monitoring comprises:
monitoring traffic flows per traffic type, wherein the particular traffic flow is associated with a specific traffic type.

6. The method as in claim 1, wherein monitoring comprises:
monitoring only one or more specific types of traffic flows.

7. The method as in claim 1, wherein the path cost threshold is based on a service level agreement (SLA).

8. The method as in claim 7, further comprising:
sending traffic flow information of the particular traffic flow to a management device for the computer network in response to the particular traffic flow being above a traffic rate threshold; and
receiving the path cost threshold for the particular traffic flow from the management device based on the SLA.

9. The method as in claim 1, wherein the path cost threshold is a maximum allowed path cost from a given source device to a given destination device.

10. The method as in claim 1, wherein the path cost threshold is a maximum allowed path cost stretch, wherein path cost stretch is computed as a difference between a first cost of a source-routed route from a given source device to a given destination device and a second cost of a DAG route on the primary DAG from the given source device to the given destination device.

11. The method as in claim 1, further comprising:
determining that the path cost threshold cannot be met for the particular traffic flow with either the source route or the secondary DAG; and
in response, notifying a management device for the computer network that the path cost threshold cannot be met.

12. The method as in claim 1, further comprising:
determining that the path cost threshold cannot be met for the particular traffic flow with either the source route or the secondary DAG; and
in response, moving one or more other traffic flows off of the primary DAG to meet the path cost threshold for the particular traffic flow.

13. The method as in claim 1, further comprising:
detecting a level of congestion of the primary DAG near the root node that surpasses a congestion threshold; and
in response, computing and sending the source route or instructing the source device to create the secondary DAG, respectively.

14. A method, comprising:
sourcing one or more traffic flows through a root node of a primary directed acyclic graph (DAG) in a computer network;
receiving instructions to cease sourcing a particular traffic flow of the traffic flows in response to the particular traffic flow being above a path cost threshold;
in response to the particular traffic flow being point-to-point (P2P), receiving and using a source route for the particular traffic flow; and
in response to the particular traffic flow being point-to-multipoint (P2MP), receiving and acting on instructions to create a secondary DAG for the particular traffic flow with the source device as the secondary DAG root.

15. The method as in claim 14, further comprising:
in response to the particular traffic flow being P2MP to a number of destinations below a DAG creation threshold, receiving and using a plurality of source routes to reach the destinations for the particular traffic flow instead of creating the secondary DAG.

16. The method as in claim 14, further comprising:
detecting a failure of the source route for the particular traffic flow;
redirecting traffic for the particular traffic flow onto the primary DAG via the root node, the traffic indicating a failure of the source route; and
in response, receiving and using a new source route for the particular traffic flow.

17. The method as in claim 14, further comprising:
receiving instructions to use the source route or the secondary DAG for a period of time.

18. The method as in claim 14, wherein the particular traffic flow is associated with a specific traffic type.

19. The method as in claim 14, further comprising:
monitoring the particular traffic flow on the secondary DAG;
detecting that the particular traffic flow is below a traffic rate threshold for a configured length of time; and
in response, tearing down the secondary DAG and redirecting the particular traffic flow onto the primary DAG.

20. An apparatus, comprising:
one or more network interfaces to communicate in a computer network;
a processor coupled to the network interfaces and adapted to execute one or more processes; and
a memory configured to store a process executable by the processor, the process when executed operable to:
monitor traffic flows through a root node of the primary directed acyclic graph (DAG) in the computer network;
detect that a particular traffic flow of the monitored traffic flows is above a path cost threshold;
determine whether the particular traffic flow from a corresponding source device is point-to-point (P2P) or point-to-multipoint (P2MP);
in response to the particular traffic flow being P2P, compute and send a source route to the source device to cause the source device to use the source route for the particular traffic flow; and
in response to the particular traffic flow being P2MP, instruct the source device to create a secondary DAG for the particular traffic flow with the source device as the secondary DAG root.

21. The apparatus as in claim 20, wherein the process when executed is further operable to:
in response to the particular traffic flow being P2MP to a number of destinations below a DAG creation threshold, compute and send a plurality of source routes to the source device to cause the source device to use the plurality of source routes to reach the destinations for the particular traffic flow instead of creating the secondary DAG.

22. An apparatus, comprising:

one or more network interfaces to communicate in a computer network;

a processor coupled to the network interfaces and adapted to execute one or more processes; and a memory configured to store a process executable by the processor, the process when executed operable to:

source one or more traffic flows through a root node of a primary directed acyclic graph (DAG) in the computer network;

receive instructions to cease sourcing a particular traffic flow of the traffic flows in response to the particular traffic flow being above a path cost threshold;

in response to the particular traffic flow being point-to-point (P2P), receive and use a source route for the particular traffic flow; and in response to the particular traffic flow being point-to-multipoint (P2MP), receive and act on instructions to create a secondary DAG for the particular traffic flow with the apparatus as the secondary DAG root.

23. The apparatus as in claim 22, wherein the process when executed is further operable to:

in response to the particular traffic flow being P2MP to a number of destinations below a DAG creation threshold, receive and use a plurality of source routes to reach the destinations for the particular traffic flow instead of creating the secondary DAG.

24. The apparatus as in claim 22, wherein the process when executed is further operable to:

detect a failure of the source route for the particular traffic flow;

redirect traffic for the particular traffic flow onto the primary DAG via the root node, the traffic indicating a failure of the source route; and in response, receive and use a new source route for the particular traffic flow.

25. The apparatus as in claim 22, wherein the process when executed is further operable to:

monitor the particular traffic flow on the secondary DAG;

detect that the particular traffic flow is below a traffic rate threshold for a configured length of time; and in response, tear down the secondary DAG and redirect the particular traffic flow onto the primary DAG.

* * * * *